(12) United States Patent
Seyama

(10) Patent No.: US 9,867,188 B2
(45) Date of Patent: Jan. 9, 2018

(54) BASE STATION AND RESOURCE ALLOCATION METHOD

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 14/852,066

(22) Filed: Sep. 11, 2015

(65) Prior Publication Data
US 2016/0088626 A1 Mar. 24, 2016

(30) Foreign Application Priority Data

Sep. 24, 2014 (JP) ................. 2014-194265

(51) Int. Cl.
*H04W 72/04* (2009.01)
*H04W 72/12* (2009.01)

(52) U.S. Cl.
CPC ........ *H04W 72/0453* (2013.01); *H04W 72/12* (2013.01)

(58) Field of Classification Search
CPC ......... H04W 72/0453; H04W 72/0473; H04W 72/12; H04W 52/34; H04W 72/08; H04W 24/02; H04W 72/1289; H04J 11/0023; H04B 17/336; H04B 7/0413; H04B 7/02; H04L 12/26; H04L 27/34; H04L 27/18
See application file for complete search history.

(56) References Cited

U.S. PATENT DOCUMENTS

2007/0060192 A1 3/2007 Morimoto et al.
2009/0316807 A1 12/2009 Kim et al.
2011/0096856 A1 4/2011 Sadowsky et al.
(Continued)

FOREIGN PATENT DOCUMENTS

JP 2003-264869 A 9/2003
JP 2007-502072 A 2/2007
(Continued)

OTHER PUBLICATIONS

Anass Benjebbour et al., "Concept and Practical Considerations of Non-orthogonal Multiple Access (NOMA) for Future Radio Access," ISPACS 2013, Nov. 2013, pp. 1-5.

*Primary Examiner* — Mohammad Adhami
*Assistant Examiner* — Shailendra Kumar
(74) *Attorney, Agent, or Firm* — Arent Fox LLP

(57) ABSTRACT

A base station including: a memory, and a processor coupled to the memory and configure to: when scheduling a plurality of terminals based on non-orthogonal multiple access in which a same radio resource having a same time and a same frequency is allocable to two or more terminals of the plurality of terminals, calculate each metric of each of selected terminal combinations and each terminals of the plurality of terminals, each of the selected terminal combinations including two or more terminals of the plurality of terminals, and determine to allocate each radio resource to each of the selected terminal combinations and each terminals of the plurality of terminals based on each metric, wherein the selected terminal combinations are obtained by selecting, from among all terminal combinations of the plurality of terminals, each terminal combination that satisfies a first condition.

8 Claims, 22 Drawing Sheets

(56) References Cited

U.S. PATENT DOCUMENTS

| | | | |
|---|---|---|---|
| 2014/0086372 A1 | 3/2014 | Kishiyama et al. | |
| 2015/0282185 A1* | 10/2015 | Nikopour | H04L 1/0002 |
| | | | 370/329 |
| 2015/0312074 A1* | 10/2015 | Zhu | H04L 27/2627 |
| | | | 370/329 |
| 2016/0142193 A1* | 5/2016 | Benjebbour | H04J 11/0043 |
| | | | 370/329 |
| 2016/0174230 A1* | 6/2016 | Benjebbour | H04W 52/346 |
| | | | 370/329 |
| 2016/0330695 A1* | 11/2016 | Benjebbour | H04W 52/262 |

FOREIGN PATENT DOCUMENTS

| | | |
|---|---|---|
| JP | 2009-529810 A | 8/2009 |
| JP | 2013-009288 A | 1/2013 |

* cited by examiner

US 9,867,188 B2

BASE STATION AND RESOURCE ALLOCATION METHOD

CROSS-REFERENCE TO RELATED APPLICATION

This application is based upon and claims the benefit of priority of the prior Japanese Patent Application No. 2014-194265, filed on Sep. 24, 2014, the entire contents of which are incorporated herein by reference.

FIELD

The embodiments discussed herein are related to a base station device and a resource allocation method.

BACKGROUND

In a 3rd Generation Partnership Project Long Term Evolution (3GPP LTE) system typifying a 4th generation mobile communication system, orthogonal frequency division multiple access (OFDMA) serving as an orthogonal multiple access (OMA) scheme is used in a downlink. In the OFDMA, in the case of allocating a common time resource to users (for example, terminals) serving as scheduling processing targets, sub-bands that do not interfere with one another (in other words, sub-bands orthogonal to one another) are allocated to respective users, as illustrated in FIG. 1. FIG. 1 is a diagram made available for explaining orthogonal multiple access. In particular, in FIG. 1, resources are allocated to two users, namely, a user #1 (UE#1) and a user #2 (UE#2). If signal-to-noise ratios (SNRs) of the users #1 and #2 are $SNR_1$ and $SNR_2$, respectively, and resource allocation rates (in other words, allocated bandwidths) of the users #1 and #2 are $\rho_1$ and $\rho_2$, respectively, a "capacity (hereinafter, called a "predicted throughput" or an "expected throughput" in some cases)" of each of the users may be expressed by the following Expression (1).

$$R_k^{(OMA)} = \rho_k \log(1+SNR_k), k=1,2 \quad (1)$$

In contrast, in a 5th generation mobile communication system, a non-orthogonal multiple access scheme has been studied. In non-orthogonal multiple access, in the case of allocating a common time resource to users serving as "scheduling processing targets, sub-bands that interfere with one another (in other words, non-orthogonal sub-bands) are allocated to respective users. Namely, in non-orthogonal multiple access, a same radio resource having a same time and a same frequency is allocable to two or more terminals. In other words, as illustrated in, for example, FIG. 2, in a common sub-band, given amounts of power are distributed (allocated) to the user #1 and the user #2. FIG. 2 is a diagram made available for explaining the non-orthogonal multiple access. In a non-orthogonal multiple access system, for example, a communication device on a receiving side has a function (in other words, a successive interference canceller (SIC) function) of cancelling a signal, addressed to another communication device and assigned to the same resource as that of the device of own, from a reception signal and performing demodulation processing and decoding processing on the reception signal after the cancellation processing.

It is assumed that, as two users serving as targets of non-orthogonal multiplexing, for example, the user #1, which is located near a base station and whose SNR is high, and the user #2, which is located away from the base station and whose SNR is low, are selected. Since the SNR of the user #2 is low, the number of modulation levels and a coding rate (in other words, a modulation and coding scheme (MCS)), applied to a signal addressed to the user #2, are lower than those applied to a signal addressed to the user #1. Therefore, it is possible for the user #1 to demodulate and decode the signal addressed to the user #2 with a high success probability. Accordingly, by cancelling the signal addressed to the user #2 from a reception signal, it is possible for the user #1 to easily remove interference from the signal addressed to the user 2#. In other words, if it is assumed that the SNR and allocated power of the user #1 are $SNR_1$ and $p_1$, respectively, the capacity of the user #1 may be expressed by the following Expression (2).

$$R_1^{(NOMA)} = \log(1+p_1 SNR_1) \quad (2)$$

On the other hand, the signal addressed to the user #1 becomes interference to the signal addressed to the user #2. Accordingly, if it is assumed that the SNR and allocated power of the user #2 are $SNR_2$ and $p_2$, respectively, the capacity of the user #2 may be expressed by the following Expression (3).

$$R_2^{(NOMA)} = \log\left(1 + \frac{p_2 SNR_2}{1 + p_1 SNR_2}\right) \quad (3)$$

In other words, the signal addressed to the user #1 is a factor in reducing the capacity of the user #2. However, since the SNR of the user #2 is originally low, an influence on the throughput of the user #2 is high due to an interference noise of an another signal other than the signal addressed to the user #1. Therefore, the influence thereon due to interference of the signal addressed to the user #1 is low.

In this way, according to the non-orthogonal multiple access, it may be expected that the sum of the capacities of all the users serving as multiplexing targets (in other words, a "system capacity") is improved compared with the orthogonal multiple access.

A technology of the related art is disclosed in Benjebbour A., Saito Y., Kishiyama Y., Li A., Harada A., and Nakamura T., "Concept and practical considerations of non-orthogonal multiple access (NOMA) for future radio access", *ISPACS* 2013, November 2013.

SUMMARY

According to an aspect of the invention, a base station includes a memory, and a processor coupled to the memory and configure to: when scheduling a plurality of terminals based on non-orthogonal multiple access in which a same radio resource having a same time and a same frequency is allocable to two or more terminals of the plurality of terminals, calculate each metric of each of selected terminal combinations and each terminals of the plurality of terminals, each of the selected terminal combinations including two or more terminals of the plurality of terminals, and determine to allocate each radio resource to each of the selected terminal combinations and each terminals of the plurality of terminals based on each metric, wherein the selected terminal combinations are obtained by selecting, from among all terminal combinations of the plurality of terminals, each terminal combination that satisfies a first condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, in non-orthogonal multiple access, there is a possibility that the processing amount of scheduling processing increases.

In other words, to date, in non-orthogonal multiple access, proportional fair (PF) metrics have been calculated for individual users serving as scheduling targets and for all combinations of users. Here, a PF metric of each of the combinations of users depends on power distribution to individual users of each of the combinations of users. Therefore, a PF metric is calculated for each of candidates of power distribution with respect to one combination of users and a PF metric whose value is a maximum among calculated PF metrics is used as a PF metric of the one combination of users. In addition, a user or a combination of users, which corresponds to a maximum PF metric among the PF metrics calculated for the individual users serving as scheduling targets and for all the combinations of users, is decided as a "resource allocation target".

Since, in this way, PF metrics are repeatedly calculated for one combination of users while changing the power distribution, a processing amount increases.

In addition, the number of combinations of users serving as calculation targets of PF metrics increases with an increase in the number of users serving as scheduling targets. In other words, if the number of users serving as scheduling targets is 30, there are 435 ($=_{30}C_2$) combinations when just limited to combinations of two users. If combinations of up to $N_{max}$ users are taken into consideration in the case where the number of users serving as scheduling targets is K, the number of combinations of users may be expressed by the following Expression (4).

$$\sum_{i=1}^{N_{max}} {}_K C_i \tag{4}$$

The disclosed technology is made in view of the above and an object thereof is to provide a base station device and a resource allocation method which are each capable of reducing a scheduling processing amount in the non-orthogonal multiple access.

Hereinafter, embodiments of a base station device and a resource allocation method, disclosed in the present application, will be described in detail, based on drawings. Note that the base station device and the resource allocation method, disclosed in the present application, are not limited by the embodiments. In addition, the same symbol is assigned to a configuration having an equivalent function in embodiments and redundant description thereof will be omitted. In addition, the same symbol is assigned to equivalent processing steps in embodiments and the redundant description thereof will be omitted.

First Embodiment

Outline of Communication System

Figure 1:
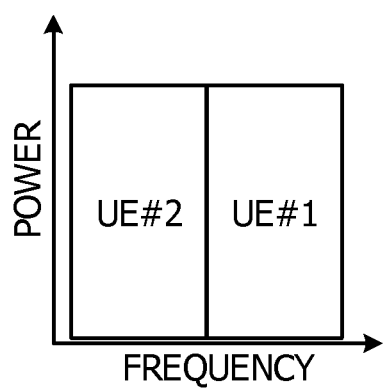
FIG. 1 is a diagram made available for explaining orthogonal multiple access.
Figure 2:
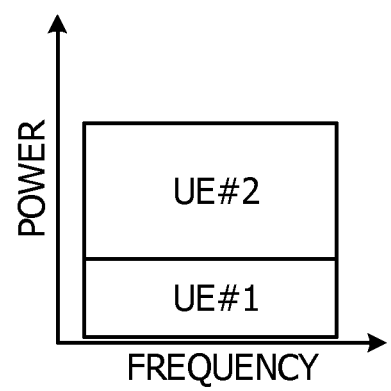
FIG. 2 is a diagram made available for explaining non-orthogonal multiple access.
Figure 3:
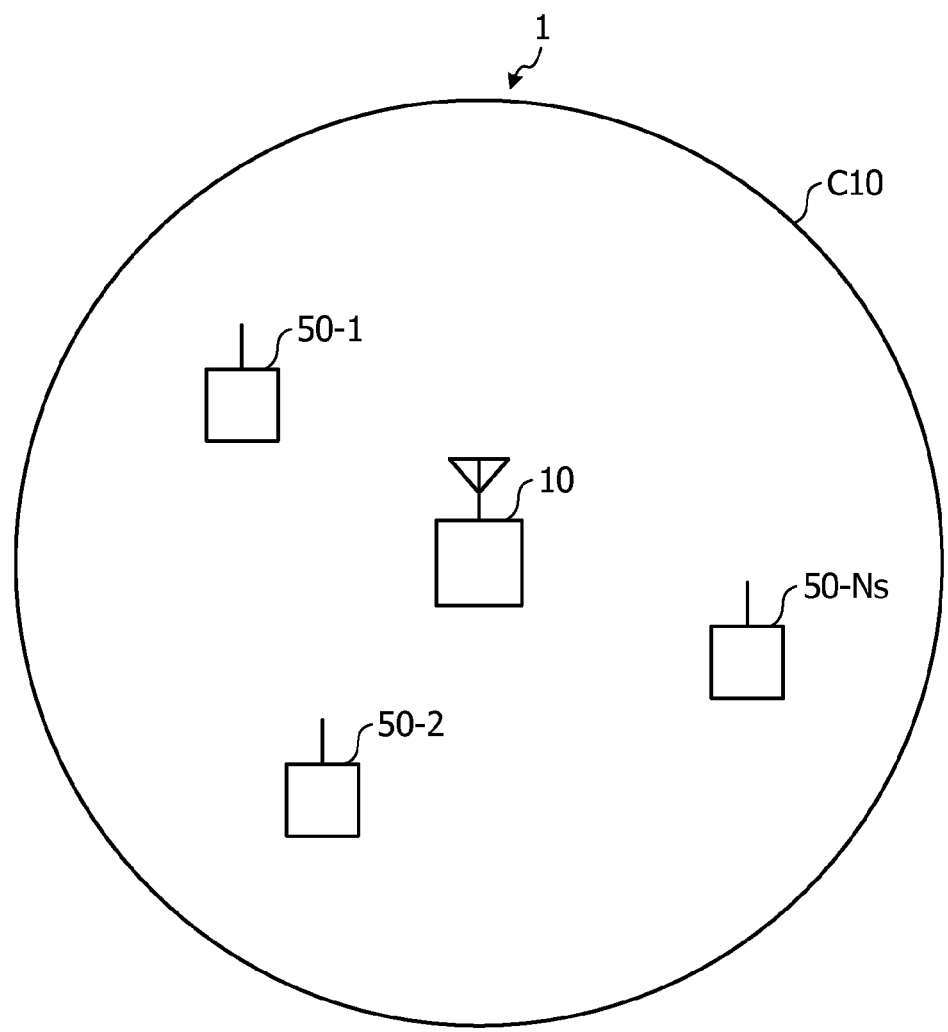
FIG. 3 is a diagram illustrating an example of a communication system of a first embodiment.

FIG. 3 is a diagram illustrating an example of a communication system of a first embodiment. In FIG. 3, a communication system 1 includes a base station 10 and terminals 50-1 to 50-$N_S$ ($N_S$ is a natural number greater than or equal to two). In what follows, in the case of not being clearly distinguished from one another, the terminals 50-1 to 50-$N_S$ are collectively called terminals 50 in some cases.

In FIG. 3, the terminals 50-1 to 50-$N_S$ are located within a cell C10 of the base station 10. The base station 10 is a base station to which the non-orthogonal multiple access in which the terminals 50 are simultaneously allocatable to a common carrier is applied. In addition, the base station 10 defines some or all of the terminals 50-1 to 50-N$_S$ as "scheduling targets". Here, explanation is performed under the assumption that all the terminals 50-1 to 50-N$_S$ are scheduling targets.

In addition, the base station 10 calculates PF metrics for individual terminals 50 and individual combinations of terminals, which serve as "metric calculation targets", within the terminals 50-1 to 50-N$_S$. In addition, based on the calculated PF metrics, the base station 10 decides a terminal 50 or a combination of terminals, which serves as a "resource allocation target", from among the "metric calculation targets". In addition, the base station 10 allocates a resource to the terminal 50 or the combination of terminals, which serves as a "resource allocation target".

Here, the base station 10 selects, as "metric calculation targets", the individual terminals 50 serving as "scheduling processing targets". From among all the combinations of terminals within the terminals 50-1 to 50-N$_S$ serving as the "scheduling processing targets", the base station 10 selects, as the "metric calculation targets", combinations of terminals, which satisfy a "first condition", and excludes combinations of terminals, which do not satisfy the "first condition", from the "metric calculation targets". The "first condition" includes a condition that, regarding a combination of terminals including, for example, a first terminal 50 and a second terminal 50, a ratio (hereinafter, called a "first ratio" in some cases) of an average throughput of the first terminal 50 to an average throughput of the second terminal 50 is larger than a "first threshold value" and is smaller than a "second threshold value".

From this, combinations of terminals that do not satisfy the "first condition" are excluded from the "metric calculation targets". Therefore, it is possible to reduce the number of metric calculation targets, and as a result, it is possible to reduce a scheduling processing amount in the non-orthogonal multiple access.

A PF metric of a combination of users (in the case of two terminals) will be considered. It is assumed that a user whose "instantaneous SNR" is high is the user #1 and a user whose "instantaneous SNR" is low is the user #2. It is assumed that the instantaneous SNRs of the user #1 and the user #2 are $\gamma_1$ and $\gamma_2$, respectively, and the average throughputs of the user #1 and the user #2 are $T_1$ and $T_2$, respectively. In addition, it is assumed that allocated power for the user #1 is $p_1$, allocated power for the user #2 is $p_2$, and total power (in other words, $p_1+p_2$) is "1". At this time, the PF metric of this combination of users may be expressed by the following Expression (5).

$$g(p_1, p_2) = T_1^{-1}\log(1 + p_1\gamma_1) + T_2^{-1}\log\left(1 + \frac{p_2\gamma_2}{1 + p_1\gamma_2}\right), \quad (5)$$

$$p_1 + p_2 = 1, p_1 \geq 0, p_2 \geq 0$$

In Expression (5), if $p_2$ is erased using a condition of $p_1+p_2=1$, the following Expression (6) may be derived.

$$g(p_1) = T_1^{-1}\log(1 + p_1\gamma_1) + T_2^{-1}\log\left(1 + \frac{(1-p_1)\gamma_2}{1 + p_1\gamma_2}\right), \quad (6)$$

$$0 \leq p_1 \leq 1$$

Figure 4:
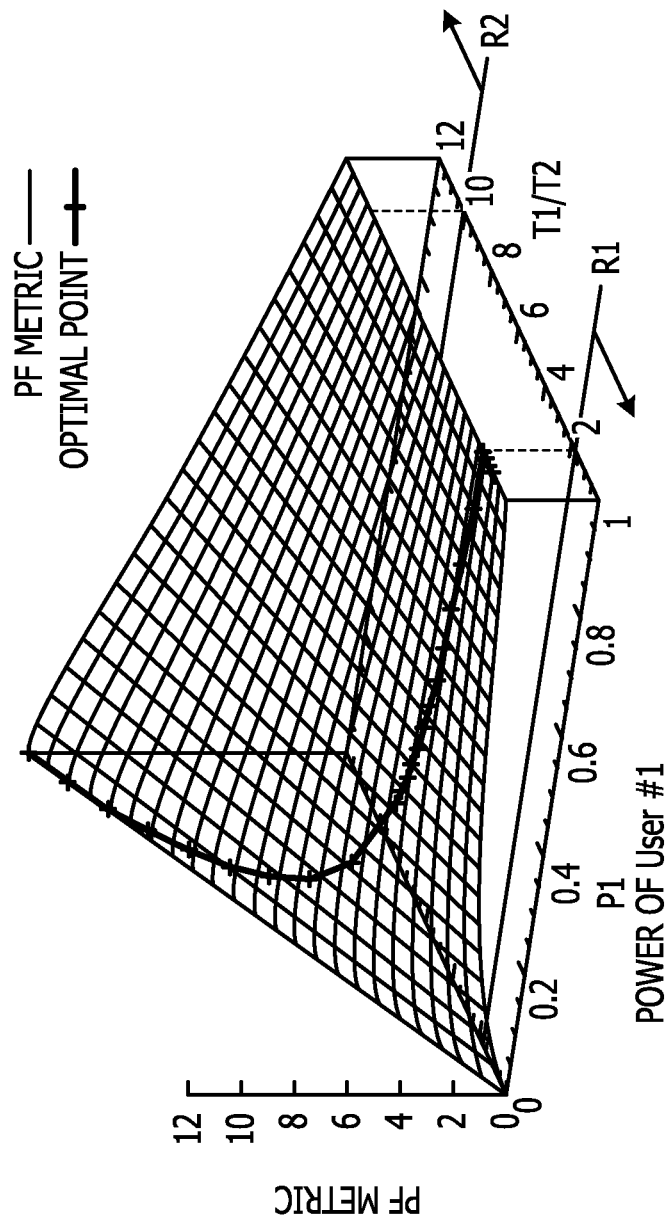
FIG. 4 is a diagram made available for explaining a characteristic of a PF metric.

Here, if it is assumed that $\gamma_1=10$ dB and $\gamma_2=0$ dB are satisfied, the PF metric of a combination of users (in the case of two terminals) has a value illustrated in FIG. 4 (the optimal point in FIG. 4) in accordance with the allocated power $p_1$ for the user #1 and a ratio ($T_1/T_2$) of the average throughput of the user #1 to the average throughput of the user #2. FIG. 4 is a diagram made available for explaining a characteristic of a PF metric. As may be seen from FIG. 4, in the case where the above-mentioned "first ratio", in other words, the ratio ($T_1/T_2$) of the average throughput of the user #1 to the average throughput of the user #2 is less than or equal to a first predetermined value (corresponding to the above-mentioned "first threshold value") $R_1$, the optimal value of $p_1$ where the PF metric becomes a maximum is "1". In other words, it is revealed that, in the case where the average throughput ratio is less than or equal to the first predetermined value, in this user combination, it is preferable to allocate the total amount of power to the user #1 rather than performing the non-orthogonal multiplexing.

On the other hand, in the case where the average throughput ratio is greater than or equal to a second predetermined value (corresponding to the above-mentioned "second threshold value") $R_2$, the optimal value of $p_1$ where the PF metric becomes a maximum is "0". In other words, it is revealed that, in the case where the average throughput ratio is greater than or equal to the second predetermined value, in this user combination, it is preferable to allocate the total amount of power to the user #2 rather than performing non-orthogonal multiplexing.

Accordingly, in the case where the average throughput ratio is less than or equal to the first predetermined value or is greater than or equal to the second predetermined value, if the PF metric of each of the user #1 and the user #2 is a "metric calculation target", it is possible to exclude the user combination of the user #1 and the user #2 from the "metric calculation targets".

Example of Configuration of Base Station

Figure 5:
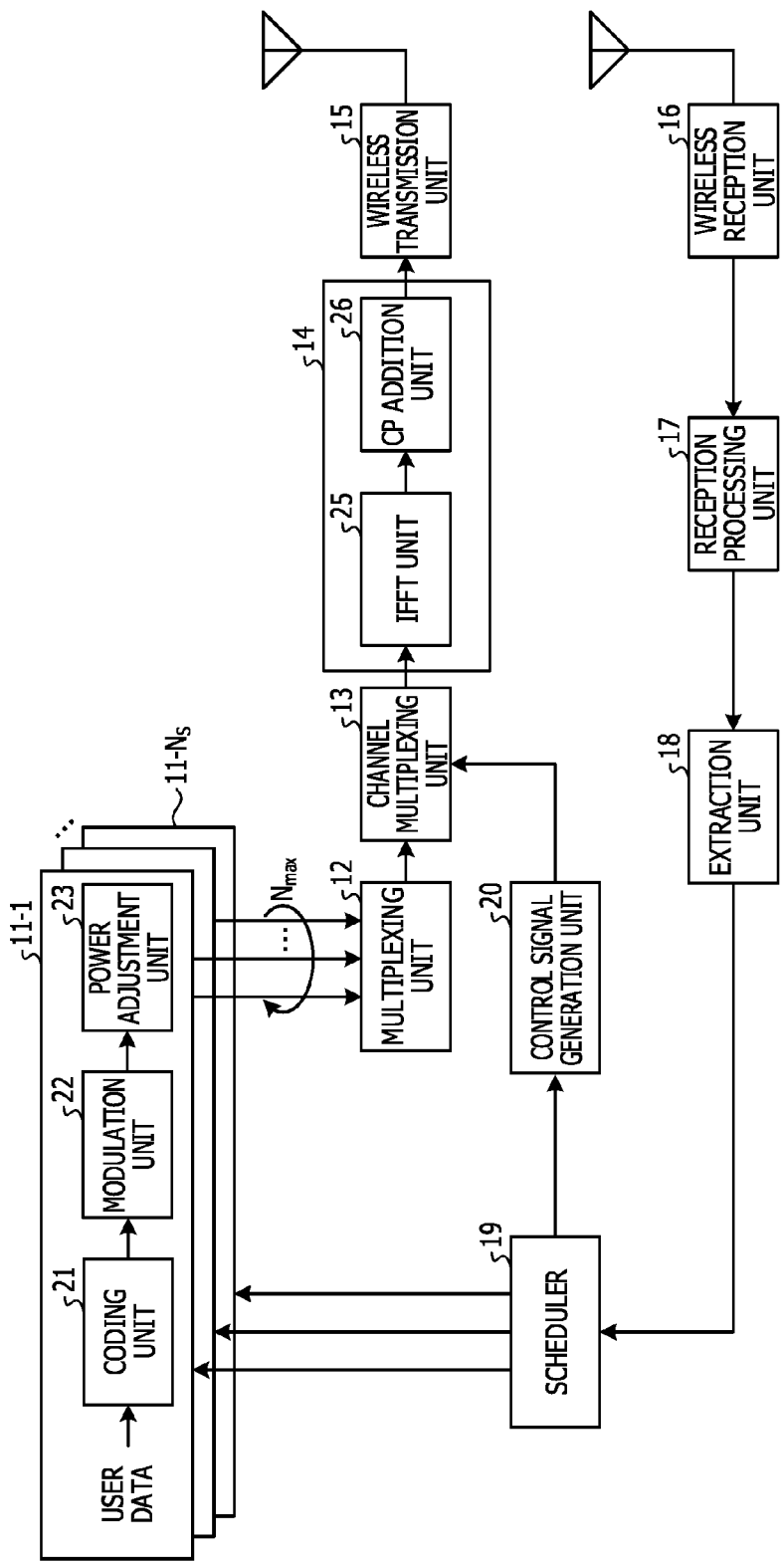
FIG. 5 is a block diagram illustrating an example of a base station of the first embodiment.

FIG. 5 is a block diagram illustrating an example of a base station of the first embodiment. In FIG. 5, the base station 10 includes user data signal generation units 11-1 to 11-N$_S$, a multiplexing unit 12, a channel multiplexing unit 13, an OFDM transmission processing unit 14, and a wireless transmission unit 15. In addition, the base station 10 includes a wireless reception unit 16, a reception processing unit 17, an extraction unit 18, a scheduler 19, and a control signal generation unit 20.

The user data signal generation units 11-1 to 11-N$_S$ correspond to the terminals 50-1 to 50-N$_S$, respectively, which serve as scheduling targets. Upon receiving "scheduling information" from the scheduler 19, each of the user data signal generation units 11 generates a user data signal, based on the scheduling information. The "scheduling information" includes the number of modulation levels, a coding rate, and a power value. As described later, the user data signals generated in the respective user data signal generation units 11 that each receive the scheduling information in the same time period become targets of the non-orthogonal multiple access. Here, it is assumed that a maximum value of a non-orthogonal multiplex number is $N_{max}$. $N_{max}$ is a natural number less than or equal to $N_S$.

As illustrated in, for example, FIG. 5, the user data signal generation units 11 each include, for example, a coding unit 21, a modulation unit 22, and a power adjustment unit 23. The coding unit 21 performs error correction coding processing on user data in accordance with the coding rate included in the scheduling information and outputs an obtained data sequence to the modulation unit 22. The modulation unit 22 performs modulation processing on the data sequence received from the coding unit 21 and outputs an obtained modulation signal to the power adjustment unit 23. The power adjustment unit 23 adjusts the power of the modulation signal received from the modulation unit 22 and outputs, to the multiplexing unit 12, a signal after the power adjustment, as the user data signal.

The multiplexing unit 12 receives, in the same time period, user data signals from the up to $N_{max}$ user data signal generation units 11 and multiplexes the received data signals. In other words, the multiplexing unit 12 superimposes the received data signals and maps a superimposed signal to a predetermined subcarrier. In addition, the multiplexing unit 12 outputs an obtained multiplexed signal to the channel multiplexing unit 13.

The channel multiplexing unit 13 multiplexes a control signal received from the control signal generation unit 20 and the multiplexed signal received from the multiplexing unit 12. Here, not the non-orthogonal multiplexing but orthogonal multiplexing (in other words, time multiplexing, frequency multiplexing, or code multiplexing) is used. In addition, the channel multiplexing unit 13 outputs the obtained multiplexed signal to the OFDM transmission processing unit 14.

The OFDM transmission processing unit 14 generates an OFDM signal from the multiplexed signal received from the multiplexing unit 13. As illustrated in FIG. 5, the OFDM transmission processing unit 14 includes an inverse fast Fourier transform (IFFT) unit 25 and a cyclic prefix (CP) addition unit 26. The IFFT unit 25 converts the multiplexed signal received from the channel multiplexing unit 13 from a signal in a frequency domain to a signal in a time domain. In addition, by adding a CP to the signal in the time domain, obtained in the IFFT unit 25, the CP addition unit 26 obtains the OFDM signal.

The wireless transmission unit 15 performs predetermined wireless transmission processing (digital-to-analog conversion, up-conversion, amplification, and so forth) on the OFDM signal obtained in the OFDM transmission processing unit 14 and transmits an obtained wireless signal via an antenna.

The wireless reception unit 16 performs predetermined wireless reception processing (down-conversion, analog-to-digital conversion, and so forth) on a wireless signal received via an antenna and outputs an obtained signal to the reception processing unit 17.

The reception processing unit 17 performs predetermined reception processing (demodulation, decoding, and so forth) on the signal received from the wireless reception unit 16 and outputs obtained reception data to the extraction unit 18.

The extraction unit 18 extracts, from the reception data received from the reception processing unit 17, control data (Ack/Nack, channel state information (including a channel quality indicator (CQI), a precoding matrix indicator (PMI), a rank indicator (RI), and so forth) and outputs the extracted control data to the scheduler 19.

The control signal generation unit 20 generates a control signal including "control information" received from the scheduler 19 and outputs the generated control signal to the channel multiplexing unit 13. The "control information" includes identification information of each of users serving as targets of the non-orthogonal multiplexing, a coding rate applied to a user data signal addressed to each of the users, the number of modulation levels, an adjusted power value, and so forth.

For each of the terminals 50 and combinations of terminals, which serves as a "metric calculation target" within the terminals 50-1 to 50-$N_S$ serving as the "scheduling processing targets", the scheduler 19 calculates a PF metric. In addition, based on the calculated PF metrics, the scheduler 19 decides a terminal 50 or a combination of terminals, which serves as a "resource allocation target", from among the "metric calculation targets". In addition, the scheduler 19 allocates a resource to the terminal 50 or the combination of terminals, which serves as the "resource allocation target".

Here, the scheduler 19 defines, as the "metric calculation targets", the individual terminals 50 serving as the "scheduling processing targets". In addition, from among all the combinations of terminals within the terminals 50-1 to 50-$N_S$ serving as the "scheduling processing targets", the scheduler 19 selects, as the "metric calculation targets", combinations of terminals, which satisfy the "first condition", and excludes combinations of terminals, which do not satisfy the "first condition", from the "metric calculation targets".

Figure 6:
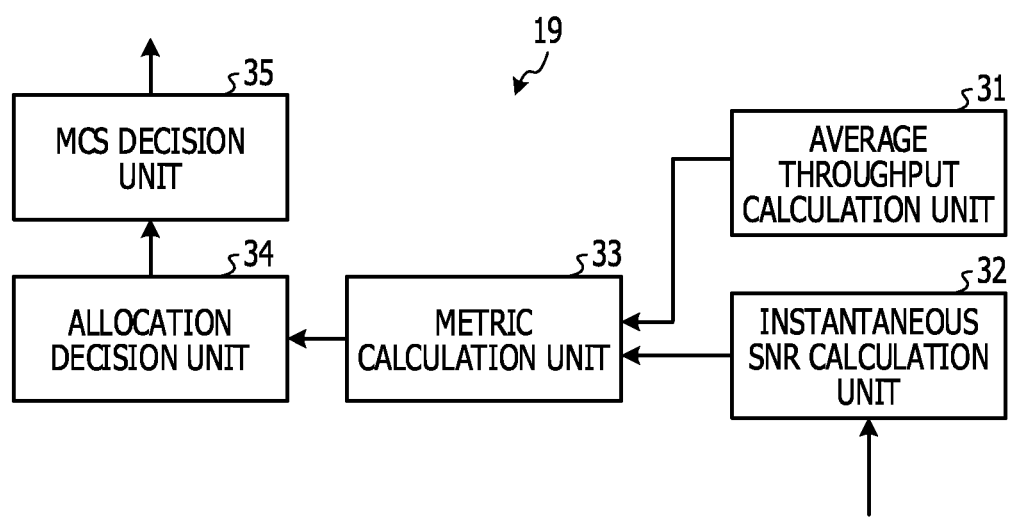
FIG. 6 is a block diagram illustrating an example of a scheduler of the first embodiment.

As illustrated in, for example, FIG. 6, the scheduler 19 includes an average throughput calculation unit 31, an instantaneous SNR calculation unit 32, a metric calculation unit 33, an allocation decision unit 34, and an MCS decision unit 35. FIG. 6 is a block diagram illustrating an example of a scheduler of the first embodiment.

The average throughput calculation unit 31 calculates the average throughput of each of the terminals 50 serving as the scheduling processing targets and outputs the calculated average throughput of each of the terminals 50 to the metric calculation unit 33.

The instantaneous SNR calculation unit 32 calculates the instantaneous SNR of each of the terminals 50 serving as the scheduling processing targets and outputs, to the metric calculation unit 33, the calculated instantaneous SNR of each of the terminals 50. The calculation of the instantaneous SNR is performed based on the channel state information transmitted from each of the terminals 50.

For each of the terminals 50 and combinations of terminals, which serves as a "metric calculation target" within the terminals 50-1 to 50-$N_S$ serving as the "scheduling processing targets", the metric calculation unit 33 calculates a PF metric. In addition, from among all the combinations of terminals within the terminals 50-1 to 50-$N_S$ serving as the "scheduling processing targets", the metric calculation unit 33 selects, as the "metric calculation targets", combinations of terminals, which satisfy the "first condition", in addition to the individual terminals 50 of the terminals 50-1 to 50-$N_S$ serving as the "scheduling processing targets". On the other hand, the metric calculation unit 33 excludes combinations of terminals, which do not satisfy the "first condition", from the "metric calculation targets".

Figure 7:
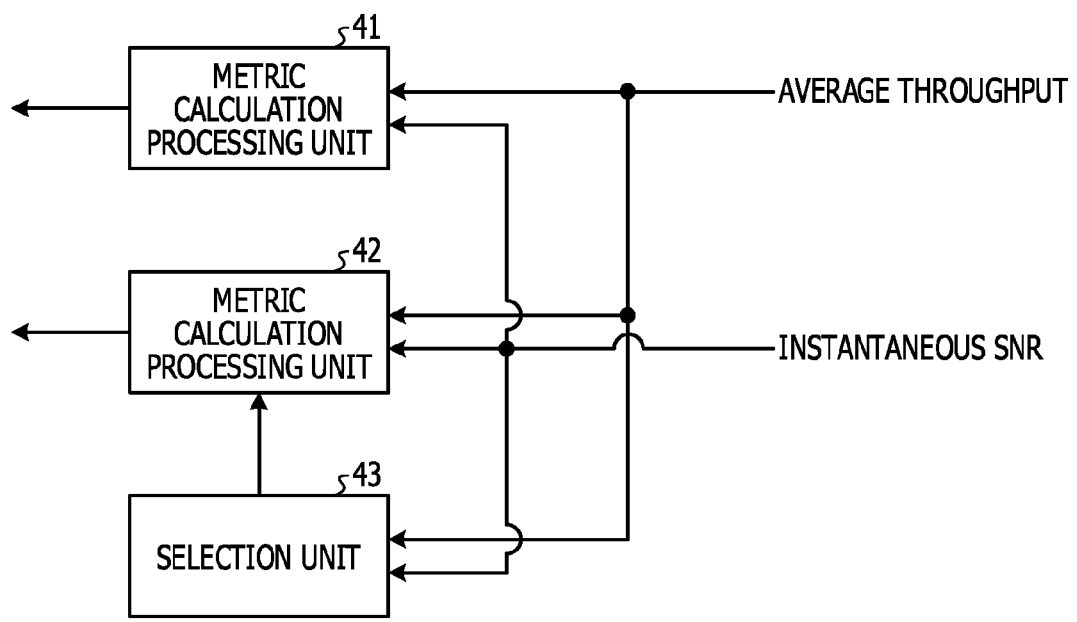
FIG. 7 is a block diagram illustrating an example of a metric calculation unit of the first embodiment.

As illustrated in, for example, FIG. 7, the metric calculation unit 33 includes a metric calculation processing unit 41, a metric calculation processing unit 42, and a selection unit 43. FIG. 7 is a block diagram illustrating an example of a metric calculation unit of the first embodiment.

Using the average throughput received from the average throughput calculation unit 31 and the instantaneous SNR received from the instantaneous SNR calculation unit 32, the metric calculation processing unit 41 calculates the PF metric of each of the terminals 50 serving as the scheduling processing targets. In other words, usually each of the terminals 50 serving as the scheduling processing targets is defined as a calculation target of the PF metric.

Using, for example, the following Expression (7), the metric calculation processing unit 41 calculates the PF metric of each of the terminals 50.

$$f^{(1)}(k) = T_k^{-1} \log(1 + \gamma_k), k = 1, 2, \ldots, K \qquad (7)$$

Here, $T_k$ is the average throughput of a k-th user and $\gamma_k$ is the instantaneous SNR of the k-th user.

From among all the combinations of terminals, in each of which the number of component terminals is up to $N_{max}$ within the terminals 50-1 to 50-$N_S$ serving as the "scheduling processing targets", the selection unit 43 selects, as the "metric calculation targets", combinations of terminals, which satisfy the "first condition", and excludes combinations of terminals, which do not satisfy the "first condition", from the "metric calculation targets".

For each of the combinations of terminals that serve as the "metric calculation targets" and are selected in the selection unit 43, the metric calculation processing unit 42 calculates the PF metric. In other words, regarding each of the combinations of terminals serving as the "metric calculation targets", the metric calculation processing unit 42 calculates the PF metric for each of candidates of power distribution and defines, as the PF metric of each of the combinations of terminals, a PF metric whose value is a maximum among the calculated PF metrics.

In other words, for each combination s(m) of terminals included in a set S(m) (in this regard, however, m=2 to $N_{max}$) of the combinations of terminals that serve as the "metric calculation targets" and that are output from the selection unit 43, the metric calculation processing unit 42 decides the PF metric and optimal power distribution in this combination of terminals. This is a maximization problem illustrated in the following Expression (8) and may be solved using an "iterative water-filling algorithm" of the related art.

$$\text{maximize } f(s) = \sum_{k \in s^{(m)}} T_k^{-1} \log\left(1 + \frac{p_k \gamma_k}{1 + \gamma_k \sum_{j=1}^{k-1} p_j}\right) \quad (8)$$

$$\text{subject to } \sum_{k=1}^{m} p_k = 1, \, p_k \geq 0, \, k = 1, 2, \ldots, m$$

$$s^{(m)} \in S^{(m)}$$

Here, the above-mentioned "first condition" is illustrated as follows.

In other words, in the case of two-user multiplexing, the "first condition" includes a condition that the following Expression (9) is satisfied.

$$\frac{\gamma_1(1 + \gamma_2)}{\gamma_2(1 + \gamma_1)} < \frac{T_1}{T_2} < \frac{\gamma_1}{\gamma_2} \quad (9)$$

Here, it is assumed that a user whose instantaneous SNR is high is the user #1 and a user whose instantaneous SNR is low is the user #2. It is assumed that the instantaneous SNRs of the user #1 and the user #2 are $\gamma_1$ and $\gamma_2$, respectively, and the average throughputs of the user #1 and the user #2 are $T_1$ and $T_2$, respectively.

In addition, in the case of three-user multiplexing, the "first condition" includes a condition that both the above-mentioned Expression (9) and the following Expression (10) are satisfied.

$$\frac{\gamma_2(1 + \gamma_3)}{\gamma_3(1 + \gamma_2)} < \frac{T_2}{T_3} < \frac{\gamma_2}{\gamma_3} \quad (10)$$

Here, it is assumed that the instantaneous SNR becomes reduced in value in the order of the user #1, the user #2, and the user #3. It is assumed that the instantaneous SNR and the average throughput of the user #3 are $\gamma_3$ and $T_3$, respectively.

In addition, in the case of m-user multiplexing whose rank is higher than or equal to four-user multiplexing, the "first condition" includes a condition that the following Expression (11) is satisfied.

$$\frac{\gamma_{m-1}(1 + \gamma_m)}{\gamma_m(1 + \gamma_{m-1})} < \frac{T_{m-1}}{T_m} < \frac{\gamma_{m-1}}{\gamma_m} \quad (11)$$

Here, it is assumed that the instantaneous SNR becomes reduced in value in the order of the user #1, the user #2, ... and the user #m. It is assumed that the instantaneous SNR and the average throughput of the user #m are $\gamma_m$ and $T_m$, respectively.

Next, a derivation process of the above-mentioned "first condition" will be described.

On Two-User Multiplexing

First, the derivation process of the "first condition" in the case of the two-user multiplexing will be described.

In the case of the two-user multiplexing, the PF metric may be expressed by the following Expression (12).

$$f(p_1, p_2) = T_1^{-1} \log(1 + p_1 \gamma_1) + T_2^{-1} \log\left(1 + \frac{p_2 \gamma_2}{1 + p_1 \gamma_2}\right), \quad (12)$$

$$p_1 + p_2 = 1, \, p_1 \geq 0, \, p_2 \geq 0$$

If being converted to a form of one variable, based on $p_1+p_2=1$, Expression (12) is expressed by the following Expression (13).

$$f(p_1) = T_1^{-1} \log(1 + p_1 \gamma_1) + T_2^{-1} \log\left(1 + \frac{(1 + p_1)\gamma_2}{1 + p_1 \gamma_2}\right), \quad (13)$$

$$0 \leq p_1 \leq 1$$

Since it is certain that a derivative be positive in order for $f(p_1)$ to be a monotonically increasing function, the following Expression (14) is derived.

$$\frac{\partial f(p_1)}{\partial p_1} = T_1^{-1} \frac{\gamma_1}{1 + p_1 \gamma_1} - T_2^{-1} \frac{\gamma_2}{1 + p_1 \gamma_2} \geq 0 \quad (14)$$

$$\frac{T_1}{T_2} \leq \frac{\gamma_1(1 + p_1 \gamma_2)}{\gamma_2(1 + p_1 \gamma_1)} = h(p_1)$$

As illustrated in the following Expression (15), $h(p_1)$ in Expression (14) is a monotonically decreasing function.

$$\frac{\partial h(p_1)}{\partial p_1} = \frac{\gamma_1}{\gamma_2} \frac{\gamma_2 - \gamma_1}{(1 + p_1 \gamma_1)^2} \leq 0 \; (\because \gamma_1 \geq \gamma_2) \quad (15)$$

Accordingly, if a condition expressed by the following Expression (16) is satisfied, the $f(p_1)$ becomes a monotonically increasing function. In this regard, however, min(x) indicates a minimum value of x.

$$\frac{T_1}{T_2} \le \min\left(\frac{\gamma_1(1+p_1\gamma_2)}{\gamma_2(1+p_1\gamma_1)}\right) = h(p_1=1) = \frac{\gamma_1(1+\gamma_2)}{\gamma_2(1+\gamma_1)} \quad (16)$$

By contrast, since it is certain that a derivative be negative in order for f($p_1$) to be a monotonically decreasing function, the following Expression (17) is derived.

$$\frac{T_1}{T_2} \ge \frac{\gamma_1(1+p_1\gamma_2)}{\gamma_2(1+p_1\gamma_1)} = h(p_1) \quad (17)$$

Accordingly, if a condition expressed by the following Expression (18) is satisfied, f($p_1$) becomes a monotonically decreasing function. In this regard, however, max(x) indicates a maximum value of x.

$$\frac{T_1}{T_2} \ge \max\left(\frac{\gamma_1(1+p_1\gamma_2)}{\gamma_2(1+p_1\gamma_1)}\right) = h(p_1=0) = \frac{\gamma_1}{\gamma_2} \quad (18)$$

In the case where the PF metric becomes a monotonically increasing function in this way, even if the non-orthogonal multiplexing is performed in this user combination, the PF metric thereof does not exceed a PF metric in the case where allocation is only performed on the user #1. In the case where, in an opposite manner, the PF metric becomes a monotonically decreasing function, even if the non-orthogonal multiplexing is performed in this user combination, the PF metric thereof does not exceed a PF metric in the case where allocation is only performed on the user #2.

From the above, by combining Expression (16) and Expression (18), the condition illustrated in Expression (9) is derived.

On Three-User Multiplexing

Next, the derivation process of the "first condition" in the case of the three-user multiplexing will be described.

In the case of the three-user multiplexing, the PF metric may be expressed by the following Expression (19).

$$f(p_1, p_2, p_3) = T_1^{-1}\log(1+p_1\gamma_1) + \quad (19)$$
$$T_2^{-1}\log\left(1+\frac{p_2\gamma_2}{1+p_1\gamma_2}\right) \cdot T_3^{-1}\log\left(1+\frac{p_3\gamma_3}{1+p_1\gamma_3+p_2\gamma_3}\right),$$
$$\sum_{k=1}^{3} p_k - 1, p_k \ge 0, k = 1, 2, 3$$

If $p_3$ in Expression (19) is erased, Expression (19) is expressed by the following Expression (20).

$$f(p_1, p_2) = T_1^{-1}\log(1+p_1\gamma_1) + \quad (20)$$
$$T_2^{-1}\log\left(1+\frac{p_2\gamma_2}{1+p_1\gamma_2}\right) + T_3^{-1}\log\left(1+\frac{(1-p_1-p_2)\gamma_3}{1+p_1\gamma_3+p_2\gamma_3}\right)$$
$$p_1+p_2 < 1, p_1 \ge 0, p_2 \ge 0$$

If Expression (20) is partially differentiated with respect to $p_2$, the following Expression (21) is obtained.

$$\frac{\partial}{\partial p_2}f(p_1, p_2) = T_2^{-1}\frac{\gamma_2}{1+(p_1+p_2)\gamma_2} - T_3^{-1}\frac{\gamma_3}{1+(p_1+p_2)\gamma_3} \quad (21)$$

It is certain that a partial derivative with respect to $p_2$ be positive in order for the PF metric expressed by Expression (20) to be a monotonically increasing function with respect to $p_2$ in the case of fixing $p_1$. Therefore, the following Expression (22) is derived.

$$\frac{\partial}{\partial p_2}f(p_1, p_2) = T_2^{-1}\frac{\gamma_2}{1+(p_1+p_2)\gamma_2} - T_3^{-1}\frac{\gamma_3}{1+(p_1+p_2)\gamma_3} > 0 \quad (22)$$

If Expression (22) is deformed, Expression (23) is derived.

$$\frac{T_2}{T_3} < \frac{\gamma_2\{1+(p_1+p_2)\gamma_3\}}{\gamma_3\{1+(p_1+p_2)\gamma_2\}} \quad (23)$$

If Expression (23) is regarded as a function of $p_{12}$ (=$p_1$+$p_2$), the following Expression (24) is derived.

$$h(p_{12}) = \frac{\gamma_2(1+p_{12}\gamma_3)}{\gamma_3(1+p_{12}\gamma_2)} \quad (24)$$
$$p_{12} = p_1 + p_2$$

As illustrated in the following Expression (25), h($p_{12}$) is a monotonically decreasing function.

$$\frac{dh(p_{12})}{dp_{12}} = \frac{\gamma_2}{\gamma_3}\frac{\gamma_3-\gamma_2}{(1+p_{12}\gamma_2)^2} \le 0 \quad (\because \gamma_2 \ge \gamma_3) \quad (25)$$

Accordingly, if a condition expressed by the following Expression (26) is satisfied, the partial derivative with respect to $p_2$ becomes positive and f($p_1$,$p_2$) becomes a monotonically increasing function with respect to $p_2$ in the case of fixing $p_1$. In other words, $p_3$=0 is an optimal value.

$$\frac{T_2}{T_3} \le \min\{h(p_1+p_2)\} = a(p_1+p_2=1) = \frac{\gamma_2(1+\gamma_3)}{\gamma_3(1+\gamma_2)} \quad (26)$$

In other words, even if non-orthogonal multiplexing is performed in this combination of three users, the PF metric thereof does not exceed the PF metric in the non-orthogonal multiplexing of the combination of two users based on the user #1 and the user #2. Accordingly, it is possible to exclude this combination of three users from the metric calculation targets.

On the other hand, if a condition expressed by the following Expression (27) is satisfied, the partial derivative with respect to $p_2$ becomes negative and f($p_1$,$p_2$) becomes a monotonically decreasing function with respect to $p_2$ in the case of fixing $p_1$. In other words, $p_2$=0 is an optimal value. In other words, it is most appropriate to allocate total power to the user #1 and the user #3.

$$\frac{T_2}{T_3} \geq \max\{h(p_1 + p_2)\} = a(p_1 + p_2 = 0) = \frac{\gamma_2}{\gamma_3} \quad (27)$$

In other words, even if non-orthogonal multiplexing is performed in this combination of three users, the PF metric thereof does not exceed the PF metric in the non-orthogonal multiplexing of the combination of two users based on the user #1 and the user #3. Accordingly, it is possible to exclude the PF metric in this combination of three users from the metric calculation targets.

Next, if $p_2$ in Expression (19) is erased, Expression (19) is expressed by the following Expression (28).

$$f(p_1, p_3) = T_1^{-1}\log(1 + p_1\gamma_1) + \quad (28)$$
$$T_2^{-1}\log\left(1 + \frac{(1 - p_1 - p_3)\gamma_2}{1 + p_1\gamma_2}\right) + T_3^{-1}\log\left(1 + \frac{p_3\gamma_3}{1 + (1 - p_3)\gamma_e}\right)$$
$$p_1 + p_3 \leq 1, \quad p_1 \geq 0, \quad p_3 \geq 0$$

If Expression (28) is partially differentiated with respect to $p_3$, the following Expression (29) is obtained.

$$\frac{\partial}{\partial p_1}f(p_1, p_3) = T_1^{-1}\frac{\gamma_1}{1 + p_1\gamma_1} - T_2^{-1}\frac{\gamma_2}{1 + p_1\gamma_2} \quad (29)$$

It is certain that a partial derivative with respect to $p_1$ be positive in order for the PF metric expressed by Expression (28) to be a monotonically increasing function with respect to $p_1$ in the case of fixing $p_3$. Therefore, the following Expression (30) is derived.

$$\frac{T_1}{T_2} \leq \frac{\gamma_1(1 + p_1\gamma_2)}{\gamma_2(1 + p_1\gamma_1)} \quad (30)$$

If Expression (30) is regarded as a function of $p_1$, the following Expression (31) is derived.

$$h(p_1) = \frac{\gamma_1(1 + p_1\gamma_2)}{\gamma_2(1 + p_1\gamma_1)} \quad (31)$$

As illustrated in the following Expression (32), $h(p_1)$ is a monotonically decreasing function.

$$\frac{\partial}{\partial p_1}h(p_1) = \frac{\gamma_1}{\gamma_2}\frac{\gamma_2 - \gamma_1}{(1 + p_1\gamma_1)^2} \leq 0 \quad (\because \gamma_1 \geq \gamma_2) \quad (32)$$

Accordingly, if a condition expressed by the following Expression (33) is satisfied, $f(p_1, p_3)$ becomes a monotonically increasing function with respect to $p_1$ in the case of fixing $p_3$. In other words, $p_2=0$ is an optimal value.

$$\frac{T_1}{T_2} \leq \min\left(\frac{\gamma_1(1 + p_1\gamma_2)}{\gamma_2(1 + p_1\gamma_1)}\right) = h(p_1 = 1) = \frac{\gamma_1(1 + \gamma_2)}{\gamma_2(1 + \gamma_1)} \quad (33)$$

In addition, it is certain that the partial derivative with respect to $p_1$ be negative in order for $f(p_1, p_3)$ to be a monotonically decreasing function with respect to $p_1$. Therefore, if a condition of the following Expression (34) is satisfied, $f(p_1, p_3)$ becomes a monotonically decreasing function with respect to $p_1$ in the case of fixing $p_3$. In other words, $p_1=0$ is an optimal value.

$$\frac{T_1}{T_2} \geq \max\left(\frac{\gamma_1(1 + p_1\gamma_2)}{\gamma_2(1 + p_1\gamma_1)}\right) = h(p_1 = 0) = \frac{\gamma_1}{\gamma_2} \quad (34)$$

From the above, a condition that both the above-mentioned Expression (9) and the following Expression (10) are satisfied is derived.

On m-User Multiplexing whose Rank Is Higher than or Equal to Four-User Multiplexing Next, the derivation process of the "first condition" in the case of m-user multiplexing whose rank is higher than or equal to four-user multiplexing will be described.

In the case of the m-user multiplexing whose rank is higher than or equal to four-user multiplexing, the PF metric may be expressed by the following Expression (35).

$$f(p_1, p_2, \ldots, p_m) = \sum_{k=1}^{m} T_k^{-1}\log\left(1 + \frac{p_k\gamma_k}{1 + \gamma_k\sum_{j=1}^{k-1}p_j}\right) \quad (35)$$
$$\sum_{k=1}^{m}p_k = 1, \quad p_k \geq 0, \quad k = 1, 2, \ldots, m$$

If $p_m$ in Expression (35) is erased, Expression (35) is expressed by the following Expression (36).

$$f(p_1, p_2, \ldots, p_{m1}) = \quad (36)$$
$$\sum_{k=1}^{m-1} T_k^{-1}\log\left(1 + \frac{p_k\gamma_k}{1 + \gamma_k\sum_{j=1}^{k-1}p_j}\right) + T_m^{-1}\log\left(1 + \frac{\left(1 - \sum_{j=1}^{m-1}p_j\right)\gamma_m}{1 + \gamma_m\sum_{j=1}^{m-1}p_j}\right)$$
$$\sum_{k=1}^{m-1}p_k \leq 1, \quad p_k \geq 0, \quad k = 1, 2, \ldots, m-1$$

If Expression (36) is partially differentiated with respect to $p_{m-1}$, the following Expression (37) is obtained.

$$\frac{\partial}{\partial p_{m-1}}f(p_1, p_2, \ldots, p_{m-1}) = \quad (37)$$
$$T_{m-1}^{-1}\frac{\gamma_{m-1}}{1 + \gamma_{m-1}\sum_{j=1}^{m-1}p_j} - T_m^{-1}\frac{\gamma_m}{1 + \gamma_m\sum_{j=1}^{m-1}p_j}$$

It is certain that a partial derivative with respect to $p_{m-1}$ be positive in order for the PF metric expressed by Expression (35) to be a monotonically increasing function with respect to $p_{m-1}$. Therefore, the following Expression (38) is derived.

$$\frac{T_{m-1}}{T_m} \leq \frac{\gamma_{m-1}\left(1 + \gamma_m \sum_{j=1}^{m-1} p_j\right)}{\gamma_m\left(1 + \gamma_{m-1} \sum_{j=1}^{m-1} p_j\right)} \quad (38)$$

If Expression (38) is regarded as a function of total power of users other than a user #m, the following Expression (39) is derived.

$$h\left(\sum_{j=1}^{m-1} p_j\right) = \frac{\gamma_{m-1}\left(1 + \gamma_m \sum_{j=1}^{m-1} p_j\right)}{\gamma_m\left(1 + \gamma_{m-1} \sum_{j=1}^{m-1} p_j\right)} \quad (39)$$

Expression (39) is a monotonically decreasing function with respect to the total power of users other than the user #m. Accordingly, if a condition expressed by the following Expression (40) is satisfied, the PF metric illustrated in Expression (36) becomes a monotonically increasing function with respect to $p_{m-1}$ in the case of fixing $p_1$ to $p_{m-2}$. In other words, $p_m=0$ is an optimal value. In other words, it is most appropriate to allocate total power to the user #1 to a user #m−1.

$$\frac{T_{m-1}}{T_m} \leq \min\left(\frac{\gamma_{m-1}\left(1 + \gamma_m \sum_{j=1}^{m-1} p_j\right)}{\gamma_m\left(1 + \gamma_{m-1} \sum_{j=1}^{m-1} p_j\right)}\right) = h\left(\sum_{j=1}^{m-1} p_j = 1\right) = \frac{\gamma_{m-1}(1 + \gamma_m)}{\gamma_m(1 + \gamma_{m-1})} \quad (40)$$

In addition, if a condition expressed by the following Expression (41) is satisfied, the PF metric illustrated in Expression (36) becomes a monotonically decreasing function with respect to $p_{m-1}$ in the case of fixing $p_1$ to $p_{m-2}$. In other words, $p_{m-1}=0$ is an optimal value. In other words, it is most appropriate to allocate total power to the user #1 to a user #m−2 and the user #m.

$$\frac{T_{m-1}}{T_m} \geq \max\left(\frac{\gamma_{m-1}\left(1 + \gamma_m \sum_{j=1}^{m-1} p_j\right)}{\gamma_m\left(1 + \gamma_{m-1} \sum_{j=1}^{m-1} p_j\right)}\right) = h\left(\sum_{j=1}^{m-1} p_j = 0\right) = \frac{\gamma_{m-1}}{\gamma_m} \quad (41)$$

From the above, a condition of satisfying the above-mentioned Expression (11) is derived.

Returning to the description of FIG. 6, the allocation decision unit 34 decides, as a "resource allocation target", a terminal 50 or a combination of terminals, which corresponds to a PF metric whose value is a maximum among PF metrics calculated in the metric calculation unit 33.

The MCS decision unit 35 decides a coding rate, the number of modulation levels, and adjusted power, which are to be applied to user data addressed to each of terminals 50 that serve as resource allocation targets and that are decided in the allocation decision unit 34. In addition, the MCS decision unit 35 generates the scheduling information and the control information, described above, and outputs the generated scheduling information and control information to the corresponding user data signal generation unit 11 and the control signal generation unit 20, respectively.

Example of Configuration of Terminal

Figure 8:
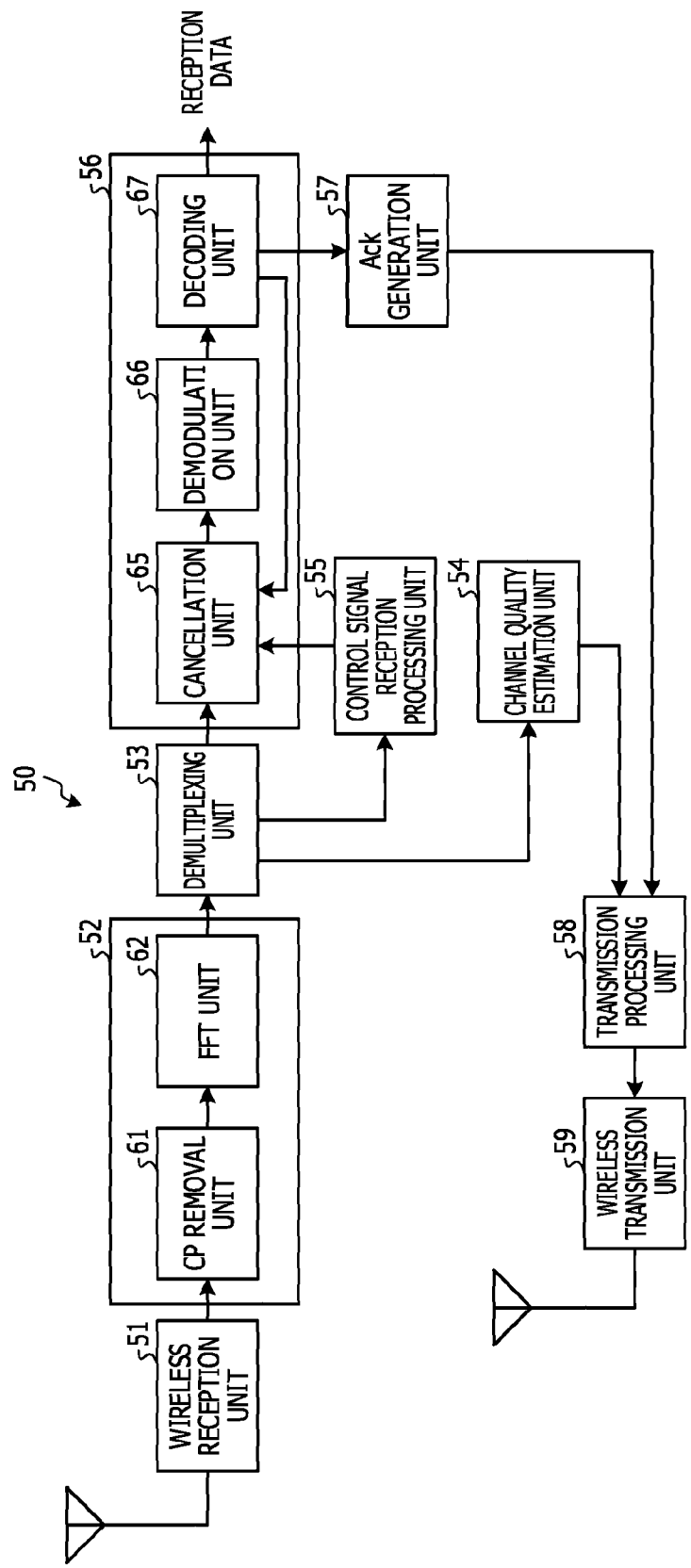
FIG. 8 is a block diagram illustrating an example of a terminal of the first embodiment.

FIG. 8 is a block diagram illustrating an example of a terminal of the first embodiment. In FIG. 8, the terminals 50 each include a wireless reception unit 51, an OFDM reception processing unit 52, a demultiplexing unit 53, a channel quality estimation unit 54, a control signal reception processing unit 55, a reception processing unit 56, an Ack generation unit 57, a transmission processing unit 58, and a wireless transmission unit 59.

The wireless reception unit 51 performs predetermined wireless reception processing (down-conversion, analog-to-digital conversion, and so forth) on a wireless signal received via an antenna and outputs an obtained OFDM signal to the OFDM reception processing unit 52.

The OFDM reception processing unit 52 forms a reception signal (corresponding to the above-mentioned multiplexed signal) from the OFDM signal received from the wireless reception unit 51. As illustrated in FIG. 8, the OFDM reception processing unit 52 includes a CP removal unit 61 and an FFT unit 62. The CP removal unit 61 removes a CP from the OFDM signal received from the wireless reception unit 51 and outputs, to the FFT unit 62, the OFDM signal after removal of the CP. The FFT unit 62 converts, from a signal in a time domain to a signal in a frequency domain, the OFDM signal after removal of the CP and outputs the obtained signal in the frequency domain to the demultiplexing unit 53.

The demultiplexing unit 53 extracts signals of respective channels from the reception signal obtained in the OFDM reception processing unit 52 and outputs the obtained signals of the respective channels to corresponding functional units. The demultiplexing unit 53 outputs, for example, a pilot signal of a pilot channel, included in the reception signal, to the channel quality estimation unit 54. In addition, the demultiplexing unit 53 outputs, to the control signal reception processing unit 55, a control signal of a control channel, included in the reception signal. In addition, the demultiplexing unit 53 outputs, to the reception processing unit 56, a data signal of a data channel, included in the reception signal.

Based on the pilot signal received from the demultiplexing unit 53, the channel quality estimation unit 54 performs estimation of channel quality and outputs, to the transmission processing unit 58, information relating to an obtained channel quality estimation value (in other words, channel state information (CQI, PMI, RI, and so forth)).

The control signal reception processing unit 55 demodulates the control signal received from the demultiplexing unit 53 and outputs control information included in a demodulation result to the reception processing unit 56. Note that, as described above, the control information includes the identification information of each of users serving as targets of the non-orthogonal multiplexing, the coding rate applied to a user data signal addressed to each of the users, the number of modulation levels, the adjusted power value, and so forth.

As illustrated in FIG. 8, the reception processing unit 56 includes a cancellation unit 65, a demodulation unit 66, and a decoding unit 67. In the reception processing unit 56, first the demodulation unit 66 and the decoding unit 67 perform demodulation processing and error correction decoding processing, respectively, on a signal addressed to another terminal 50 that is different from the device itself and that serves as a target of the non-orthogonal multiplexing and whose MCS is lower than the MCS of the device itself and is a minimum. In addition, in the case of successful error correction decoding, the decoding unit 67 feeds back, to the cancellation unit 65, obtained reception data addressed to the other terminal 50 different from the device itself. In addition, the cancellation unit 65 cancels the reception data received from the decoding unit 67 from the data signal of the data channel received from the demultiplexing unit 53. The demodulation processing, the decoding processing, and the cancellation processing, described above, are performed on all terminals 50 that are different from the device itself and whose MCSs are lower than the MCS of the device itself. In addition, the demodulation unit 66 and the decoding unit 67 perform the demodulation processing and the error correction decoding processing, respectively, on a data signal addressed to the device itself.

In the case where the decoding unit 67 succeeds in error correction decoding of the data signal addressed to the device itself, the Ack generation unit 57 generates and outputs an Ack signal to the transmission processing unit 58 and in the case where the decoding unit 67 fails in error correction decoding, the Ack generation unit 57 generates and outputs a Nack signal to the transmission processing unit 58.

The transmission processing unit 58 performs predetermined transmission processing (encoding, modulation, and so forth) on an input signal and outputs an obtained modulation signal to the wireless transmission unit 59.

The wireless transmission unit 59 performs predetermined wireless transmission processing (digital-to-analog conversion, up-conversion, and so forth) on the modulation signal received from the transmission processing unit 58 and transmits an obtained wireless signal via an antenna.

Example of Operation of Communication System

Figure 9:
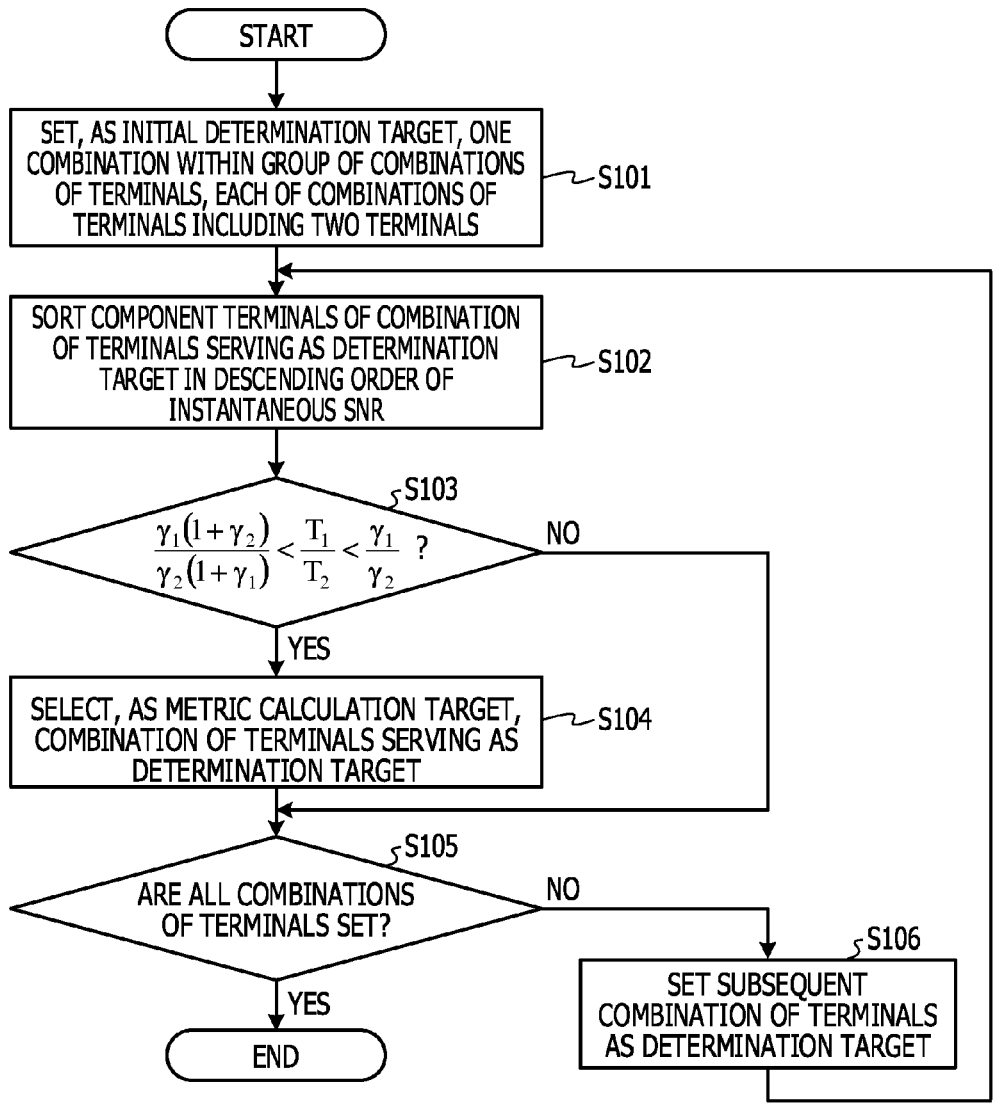
FIG. 9 is a diagram made available for explaining a selection method for a metric calculation target of the first embodiment.
Figure 10:
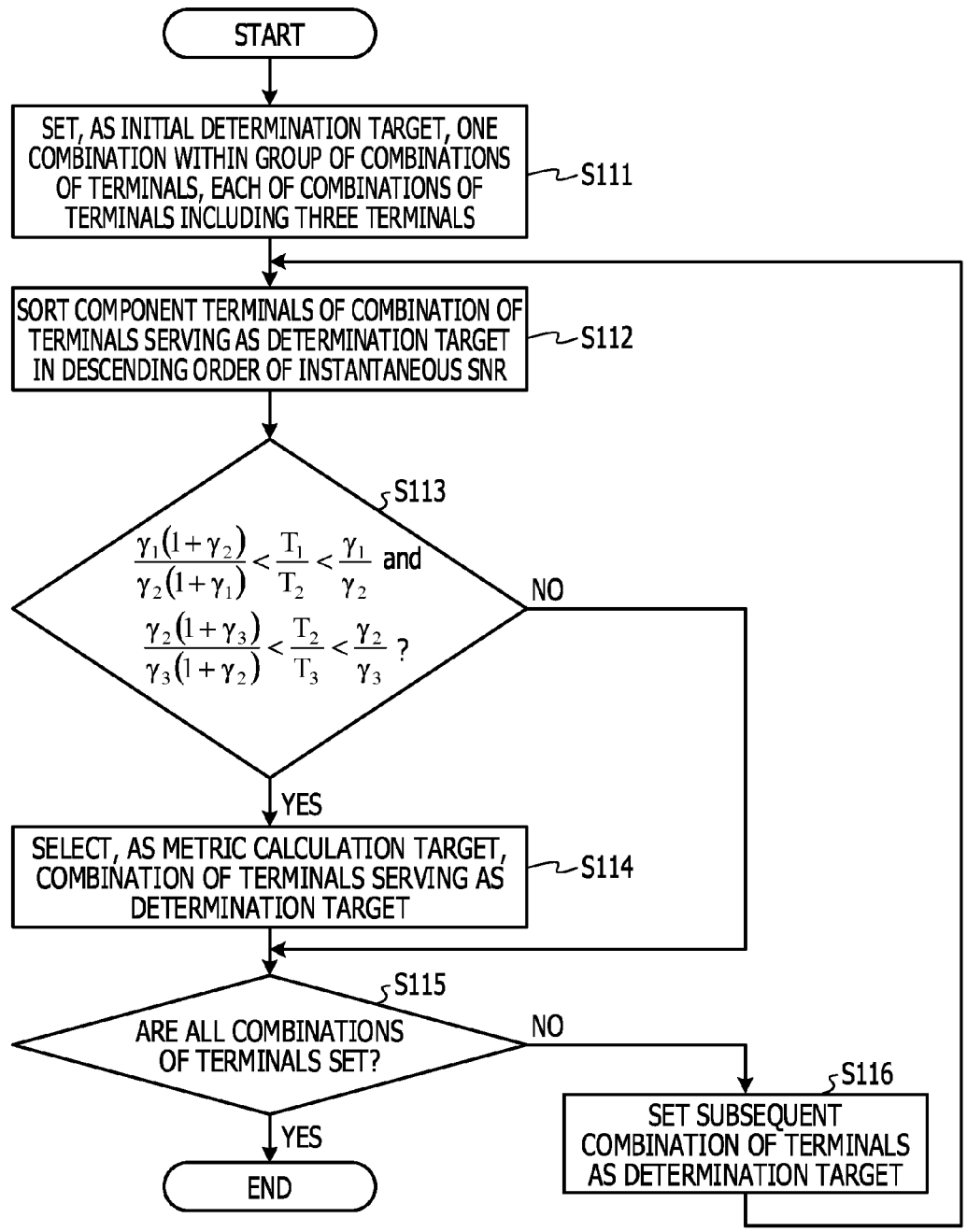
FIG. 10 is a diagram made available for explaining a selection method for a metric calculation target of the first embodiment.
Figure 11:
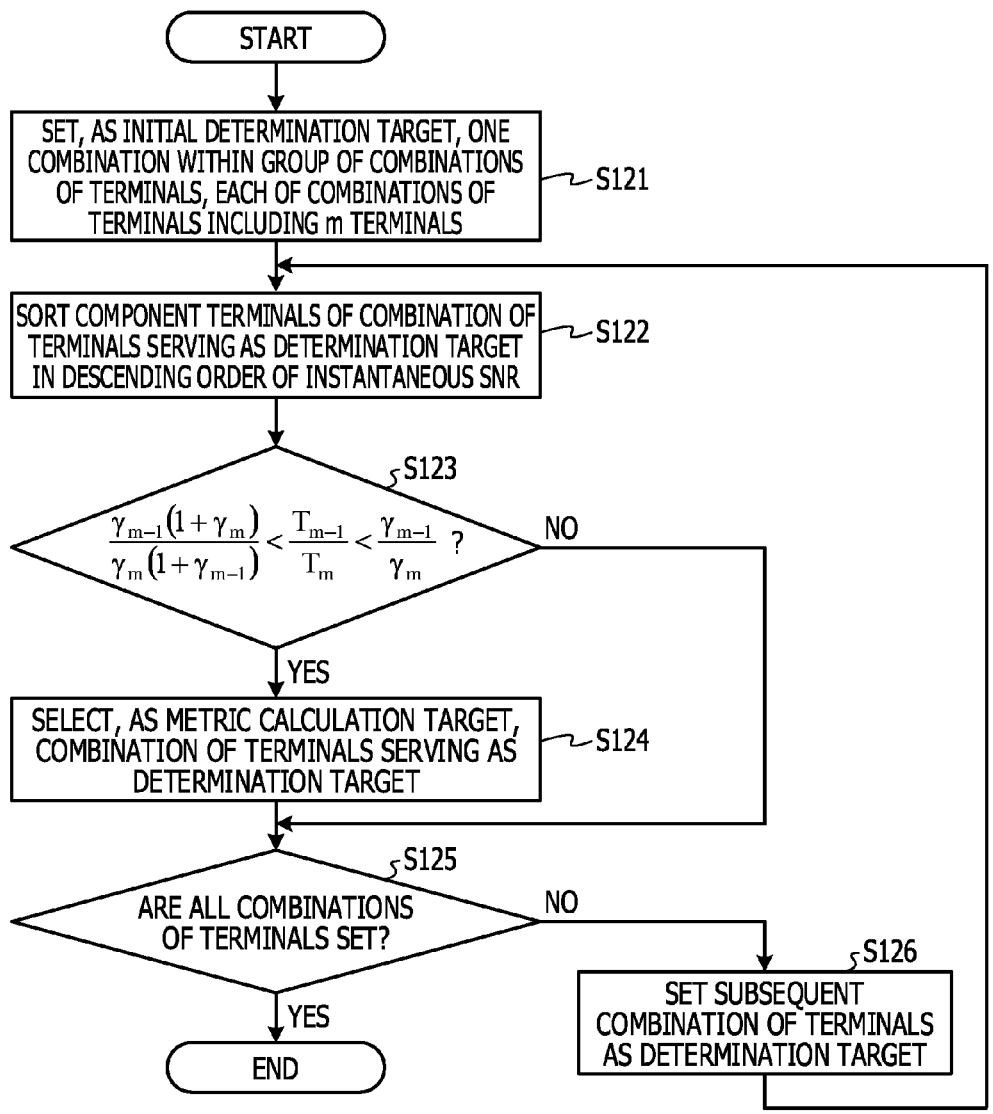
FIG. 11 is a diagram made available for explaining a selection method for a metric calculation target of the first embodiment.

An example of a processing operation of the communication system 1 having the above-mentioned configuration will be described. Here, in particular, a selection method for a "metric calculation target", based on the selection unit 43 in the base station 10, will be described. FIG. 9 to FIG. 11 are diagrams each made available for explaining a selection method for a metric calculation target of the first embodiment. FIG. 9 is related to a selection method for a metric calculation target for combinations of terminals, each of the combinations of terminals including two terminals 50, and FIG. 10 is related to a selection method for a metric calculation target for combinations of terminals, each of the combinations of terminals including three terminals 50. In addition, FIG. 11 is related to a selection method for a metric calculation target for combinations of terminals, each of the combinations of terminals including m terminals 50 (m is a natural number greater than or equal to four).

As described above, from among all the combinations of terminals, in each of which the number of component terminals is up to $N_{max}$ within the terminals 50-1 to 50-$N_S$ serving as the "scheduling processing targets", the selection unit 43 selects, as the "metric calculation targets", combinations of terminals, which satisfy the "first condition", and excludes combinations of terminals, which do not satisfy the "first condition", from the "metric calculation targets".

In accordance with a flow in, for example, FIG. 9, the selection unit 43 selects a metric calculation target for combinations of terminals, each of the combinations of terminals including two terminals 50.

In other words, the selection unit 43 sets, as an initial "determination target", one combination within a group of the combinations of terminals, each of the combinations of terminals including two terminals 50 (step S101).

The selection unit 43 sorts component terminals 50 of the set combination of terminals serving as a determination target in descending order of instantaneous SNR (step S102).

The selection unit 43 determines whether or not the set combination of terminals serving as a determination target satisfies the "first condition", in other words, the above-mentioned Expression (9) (step S103).

In the case where it is determined that the "first condition" is satisfied (step S103: affirmative), the selection unit 43 selects, as a metric calculation target, the combination of terminals serving as a determination target (step S104). On the other hand, in the case where it is determined that the "first condition" is not satisfied (step S103: negative), the selection unit 43 excludes, from metric calculation targets, the combination of terminals serving as a determination target. In other words, the processing step proceeds to a step S105.

The selection unit 43 determines whether finishing setting all combinations of terminals as determination targets or not (step S105), and in the case of not finishing setting (step S105: negative), the selection unit 43 sets a subsequent combination of terminals as a determination target (step S106). In addition, a processing flow returns to the step S102. In the case of finishing setting all combinations of terminals as determination targets (step S105: affirmative), the processing flow in FIG. 9 is terminated.

Next, in accordance with a flow in FIG. 10, the selection unit 43 selects a metric calculation target for combinations of terminals, each of the combinations of terminals including three terminals 50.

In other words, the selection unit 43 sets, as an initial "determination target", one combination within a group of the combinations of terminals, each of the combinations of terminals including three terminals 50 (step S111).

The selection unit 43 sorts component terminals 50 of the set combination of terminals serving as a determination target in descending order of instantaneous SNR (step S112).

The selection unit 43 determines whether or not the set combination of terminals serving as a determination target satisfies the "first condition", in other words, both the above-mentioned Expressions (9) and (10) (step S113).

In the case where it is determined that the "first condition" is satisfied (step S113: affirmative), the selection unit 43 selects, as a metric calculation target, the combination of terminals serving as a determination target (step S114). On the other hand, in the case where it is determined that the "first condition" is not satisfied (step S113: negative), the selection unit 43 excludes, from metric calculation targets, the combination of terminals serving as a determination target. In other words, the processing step proceeds to a step S115.

The selection unit 43 determines whether finishing setting all combinations of terminals as determination targets or not (step S115), and in the case of not finishing setting (step S115: negative), the selection unit 43 sets a subsequent combination of terminals as a determination target (step S116). In addition, a processing flow returns to the step S112. In the case of finishing setting all combinations of terminals as determination targets (step S115: affirmative), the processing flow in FIG. 10 is terminated.

Next, in accordance with a flow in FIG. 11, the selection unit 43 selects a metric calculation target for combinations of terminals, each of the combinations of terminals including m terminals 50 (m is a natural number greater than or equal to four). This flow is repeatedly performed until m reaches $N_{max}$.

In other words, the selection unit 43 sets, as an initial "determination target", one combination within a group of the combinations of terminals, each of the combinations of terminals including m terminals 50 (step S121).

The selection unit 43 sorts component terminals 50 of the set combination of terminals serving as a determination target in descending order of instantaneous SNR (step S122).

The selection unit 43 determines whether or not the set combination of terminals serving as a determination target satisfies the "first condition", in other words, the above-mentioned Expression (11) (step S123).

In the case where it is determined that the "first condition" is satisfied (step S123: affirmative), the selection unit 43 selects, as a metric calculation target, the combination of terminals serving as a determination target (step S124). On the other hand, in the case where it is determined that the "first condition" is not satisfied (step S123: negative), the selection unit 43 excludes, from metric calculation targets, the combination of terminals serving as a determination target. In other words, the processing step proceeds to a step S125.

The selection unit 43 determines whether finishing setting all combinations of terminals as determination targets or not (step S125), and in the case of not finishing setting (step S125: negative), the selection unit 43 sets a subsequent combination of terminals as a determination target (step S126). In addition, a processing flow returns to the step S122. In the case of finishing setting all combinations of terminals as determination targets (step S125: affirmative), the processing flow in FIG. 11 is terminated.

As described above, according to the present embodiment, the base station 10 is a base station to which the non-orthogonal multiple access in which the terminals 50 are simultaneously allocatable to a common carrier is applied. In addition, in the, base station 10, from among all the combinations of terminals serving as determination targets within a group of the terminals 50 serving as the scheduling processing targets, the selection unit 43 selects, as the "metric calculation targets", combinations of terminals, which satisfy the "first condition", in addition to the individual terminals 50 of the group of the terminals 50 serving as the "scheduling processing targets", and the selection unit 43 excludes combinations of terminals, which do not satisfy the first condition, from the "metric calculation targets".

According to the configuration of the base station 10, combinations of terminals that do not satisfy the "first condition" are excluded from the "metric calculation targets". Therefore, it is possible to reduce the number of metric calculation targets, and as a result, it is possible to reduce a scheduling processing amount in the non-orthogonal multiple access.

The above-mentioned "first condition" includes a condition that, regarding a combination of terminals including the first terminal 50 and the second terminal 50, the first ratio ($T_1/T_2$) of a first average throughput $T_1$ of the first terminal 50 to a second average throughput $T_2$ of the second terminal 50 is larger than the "first threshold value" and is smaller than the "second threshold value".

According to the configuration of the base station 10, based on simple determination of whether or not the first ratio ($T_1/T_2$) falls within a predetermined range (a range larger than the first threshold value and smaller than the second threshold value), it is possible to select a metric calculation target. From this, it is possible to reduce a scheduling processing amount in the non-orthogonal multiple access.

In addition, each of the above-mentioned "first threshold value" and "second threshold value" is a value based on a second ratio ($\gamma_1/\gamma_2$) of a first instantaneous SNR $\gamma_1$ of the first terminal 50 to a second instantaneous SNR $\gamma_2$ of the second terminal 50.

Second Embodiment

In a second embodiment, before determining whether or not the above-mentioned "first condition" is satisfied, it is determined whether or not a "second condition" is satisfied. In addition, in the case where the "second condition" is not satisfied, a combination of terminals serving as a determination target is excluded from metric calculation targets. On the other hand, in the case where the "second condition" is satisfied, it is determined whether or not the "first condition" is satisfied. The "second condition" includes a condition that, regarding a combination of terminals including a first terminal and a second terminal, the first ratio of the first average throughput of the first terminal to the second average throughput of the second terminal is larger than "1". Note that since being similar to that of the base station 10 of the first embodiment, a basic configuration of a base station of the second embodiment will be described with reference to FIGS. 5 to 7.

Example of Configuration of Base Station

In the base station 10 of the second embodiment, before determining whether or not the above-mentioned "first condition" is satisfied, the selection unit 43 determines whether or not the "second condition" is satisfied. In addition, in the case where the "second condition" is not satisfied, the selection unit 43 excludes, from metric calculation targets, a combination of terminals serving as a determination target. On the other hand, in the case where the "second condition" is satisfied, the selection unit 43 determines whether or not the "first condition" is satisfied.

The above-mentioned "second condition" is illustrated as follows.

In other words, in the case of two-user multiplexing, the "second condition" includes a condition that the following Expression (42) is satisfied.

$$\frac{T_1}{T_2} > 1 \tag{42}$$

In addition, in the case of the three-user multiplexing, the "second condition" includes a condition that both the above-mentioned Expression (42) and the following Expression (43) are satisfied.

$$\frac{T_2}{T_3} > 1 \tag{43}$$

In addition, in the case of the m-user multiplexing whose rank is higher than or equal to four-user multiplexing, the "second condition" includes a condition that the following Expression (44) is satisfied.

$$\frac{T_{m-1}}{T_m} > 1 \tag{44}$$

Here, a derivation process of the above-mentioned "second condition" will be described.

On Two-User Multiplexing

If paying attention to a first term and a second term other than reciprocals of average throughputs in the above-mentioned Expression (14), the inequality expressed by Expression (45) may be acceptable.

$$\frac{\gamma_1}{1+p_1\gamma_1} = \frac{1}{\gamma_1^{-1}+p_1} \geq \frac{1}{\gamma_2^{-1}+p_1} = \frac{\gamma_2}{1+p_1\gamma_2} \quad (45)$$

Accordingly, in the case where the following Expression (46) is satisfied, the following Expression (47) is satisfied.

$$T_1/T_2 \leq 1 \quad (46)$$

$$\frac{\partial g(p_1)}{\partial p_1} \geq 0 \quad (47)$$

In other words, in the case where the above-mentioned Expression (46) is satisfied, the PF metric becomes a monotonically increasing function with respect to $p_1$ regardless of the instantaneous SNR.

Accordingly, at the time of calculating $T_1/T_2$, it is determined whether or not a condition expressed by Expression (42) is satisfied, and in the case where the condition expressed by Expression (42) is not satisfied, a combination of terminals serving as a determination target may be excluded from metric calculation targets. In addition to this, in the case where the condition expressed by Expression (42) is satisfied, it may be determined whether or not the above-mentioned "first condition" is satisfied. From this, it is possible to reduce a calculation processing amount in selection processing.

On Three-User Multiplexing

If paying attention to a first term and a second term other than reciprocals of average throughputs in the above-mentioned Expression (22), the inequality expressed by Expression (48) may be accepted.

$$\frac{\gamma_2}{1+(p_1+p_2)\gamma_2} = \frac{1}{\gamma_2^{-1}+(p_1+p_2)} \geq \frac{1}{\gamma_3^{-1}+(p_1+p_2)} = \frac{\gamma_3}{1+(p_1+p_2)\gamma_3} \quad (48)$$

Accordingly, in the case where the following Expression (49) is satisfied, the PF metric becomes a monotonically increasing function with respect to $p_2$ regardless of the instantaneous SNR.

$$\frac{T_2}{T_3} \leq 1 \quad (49)$$

In addition, in the case where the following Expression (50) is satisfied, the PF metric becomes a monotonically increasing function with respect to $p_1$ regardless of the instantaneous SNR.

$$\frac{T_1}{T_2} \leq 1 \quad (50)$$

Accordingly, at the time of calculating $T_1/T_2$ and $T_2/T_3$, it is determined whether or not both Expression (42) and Expression (43) are satisfied, and in the case where at least one of Expression (42) and Expression (43) is not satisfied, a combination of terminals serving as a determination target may be excluded from metric calculation targets. In addition to this, in the case where both Expression (42) and Expression (43) are satisfied, it may be determined whether or not the above-mentioned "first condition" is satisfied. From this, it is possible to reduce a calculation processing amount in the selection processing.

m-User Multiplexing whose Rank Is Higher than or Equal to Four-User Multiplexing Using the above-mentioned Expression (37), based on the same kind of thinking as those in cases of the two-user multiplexing and the three-user multiplexing, it is possible to derive the condition expressed by the above-mentioned Expression (44). Accordingly, at the time of calculating $T_1/T_2$ and $T_m/T_{m-1}$, it is determined whether or not Expression (37) is satisfied, and in the case where Expression (37) is not satisfied, a combination of terminals serving as a determination target may be excluded from metric calculation targets. In addition to this, in the case where Expression (37) is satisfied, it may be determined whether or not the above-mentioned "first condition" is satisfied. From this, it is possible to reduce a calculation processing amount in the selection processing.

Example of Operation of Base Station

Figure 12:
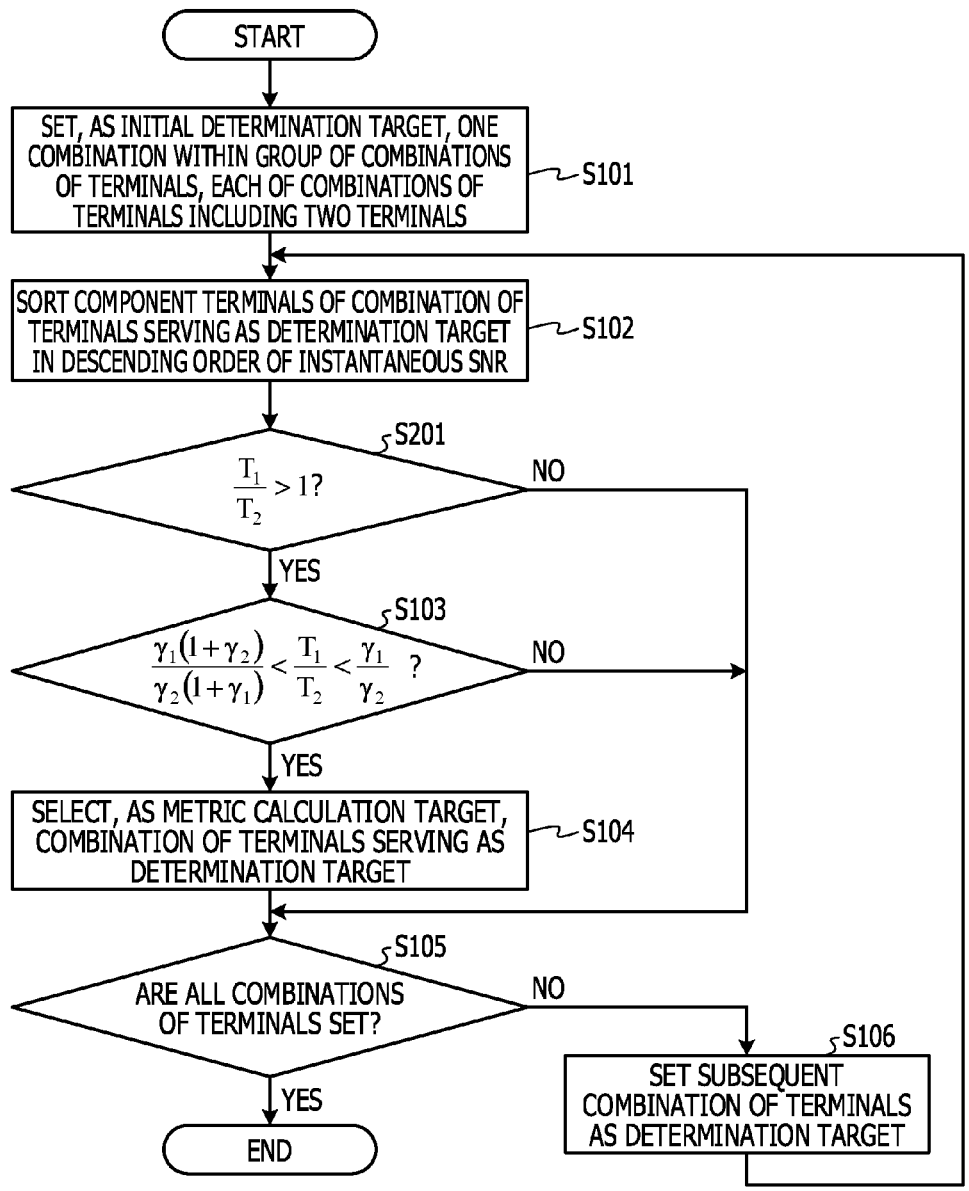
FIG. 12 is a diagram made available for explaining a selection method for a metric calculation target of a second embodiment.
Figure 13:
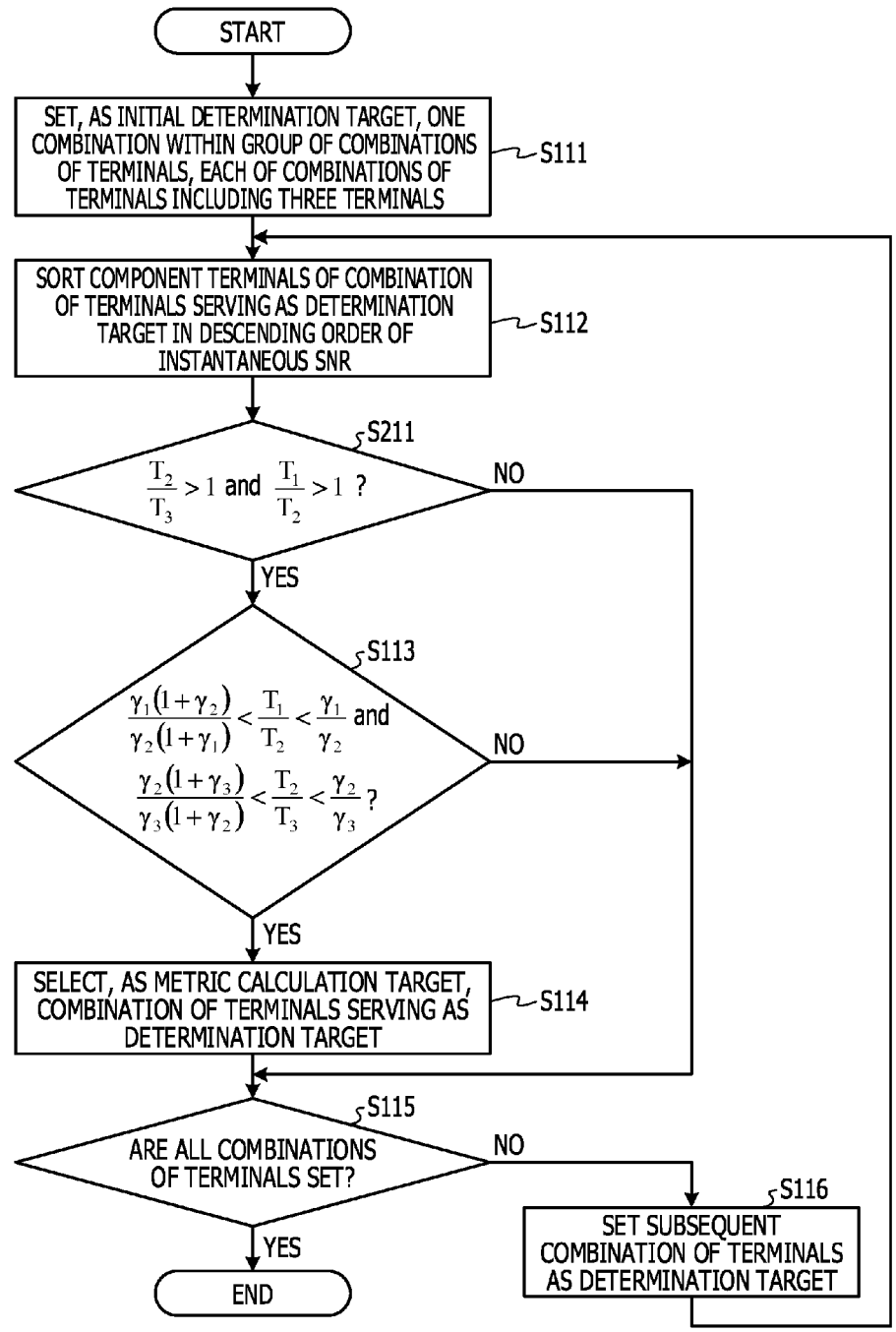
FIG. 13 is a diagram made available for explaining a selection method for a metric calculation target of the second embodiment.
Figure 14:
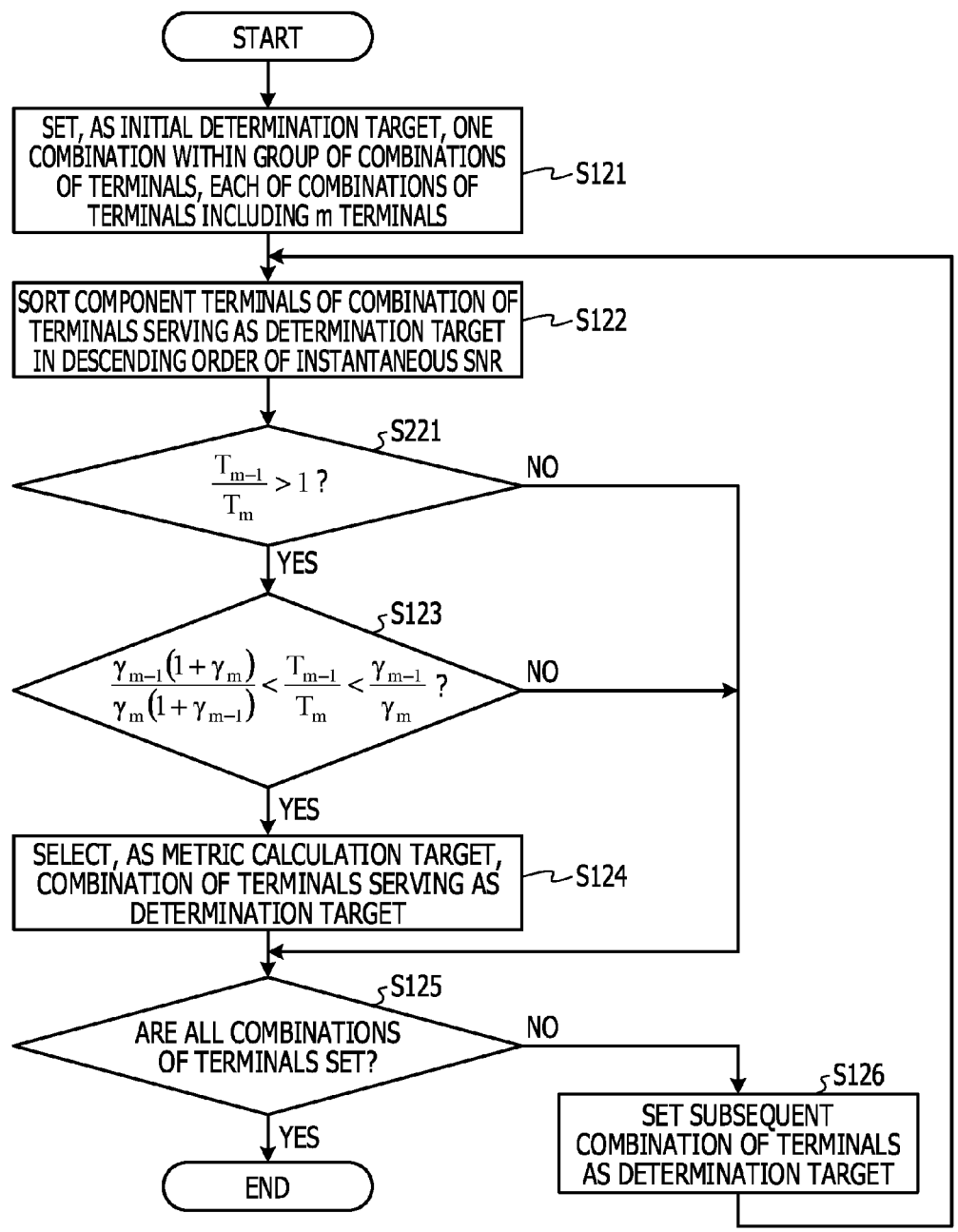
FIG. 14 is a diagram made available for explaining a selection method for a metric calculation target of the second embodiment.

An example of a processing operation of the base station 10 having the above-mentioned configuration in the second embodiment will be described. Here, in particular, a selection method for a "metric calculation target", based on the selection unit 43 in the base station 10, will be described. FIG. 12 to FIG. 14 are diagrams each made available for explaining a selection method for a metric calculation target of the second embodiment. FIG. 12 is related to a selection method for a metric calculation target for combinations of terminals, each of the combinations of terminals including two terminals 50, and FIG. 13 is related to a selection method for a metric calculation target for combinations of terminals, each of the combinations of terminals including three terminals 50. In addition, FIG. 14 is related to a selection method for a metric calculation target for combinations of terminals, each of the combinations of terminals including m terminals 50 (m is a natural number greater than or equal to four).

As described above, before determining whether or not the above-mentioned "first condition" is satisfied, the selection unit 43 in the base station 10 of the second embodiment determines whether or not the "second condition" is satisfied. In addition, in the case where the "second condition" is not satisfied, the selection unit 43 excludes, from metric calculation targets, a combination of terminals serving as a determination target. On the other hand, in the case where the "second condition" is satisfied, the selection unit 43 determines whether or not the "first condition" is satisfied.

In accordance with a flow in, for example, FIG. 12, the selection unit 43 selects a metric calculation target for combinations of terminals, each of the combinations of terminals including two terminals 50.

In other words, the selection unit 43 determines whether or not a set combination of terminals serving as a determination target satisfies the "second condition", in other words, the above-mentioned Expression (42) (step S201).

In the case where the condition of the above-mentioned Expression (42) is not satisfied (step S201: negative), the selection unit 43 excludes, from metric calculation targets, the combination of terminals serving as a determination target. In other words, the processing step proceeds to the step S105. On the other hand, in the case where the condition of the above-mentioned Expression (42) is satisfied (step S201: affirmative), the selection unit 43 performs the determination step in the step S103.

Next, in accordance with a flow in FIG. 13, the selection unit 43 selects a metric calculation target for combinations of terminals, each of the combinations of terminals including three terminals 50.

In other words, the selection unit 43 determines whether or not a set combination of terminals serving as a determination target satisfies the "second condition", in other words, both the above-mentioned Expression (42) and Expression (43) (step S211).

In the case where at least one of the above-mentioned Expression (42) and Expression (43) is not satisfied (step S211: negative), the selection unit 43 excludes, from metric calculation targets, the combination of terminals serving as a determination target. In other words, the processing step proceeds to the step S115. On the other hand, in the case where both the above-mentioned Expression (42) and Expression (43) are satisfied (step S211: affirmative), the selection unit 43 performs the determination step in the step S113.

Next, in accordance with a flow in FIG. 14, the selection unit 43 selects a metric calculation target for combinations of terminals, each of the combinations of terminals including m terminals 50 (m is a natural number greater than or equal to four). This flow is repeatedly performed until m reaches $N_{max}$.

In other words, the selection unit 43 determines whether or not a set combination of terminals serving as a determination target satisfies the "second condition", in other words, the above-mentioned Expression (44) (step S221).

In the case where the condition of the above-mentioned Expression (44) is not satisfied (step S221: negative), the selection unit 43 excludes, from metric calculation targets, the combination of terminals serving as a determination target. In other words, the processing step proceeds to the step S125. On the other hand, in the case where the condition of the above-mentioned Expression (44) is satisfied (step S221: affirmative), the selection unit 43 performs the determination step in the step S123.

As described above, according to the present embodiment, in the base station 10, regarding a combination of terminals including the first terminal 50 and the second terminal 50, the selection unit 43 determines whether or not the "second condition" of the first ratio ($T_1/T_2$) of the first average throughput $T_1$ of the first terminal 50 to the second average throughput $T_2$ of the second terminal 50 being larger than "1" is satisfied. In addition, in the case where the second condition is not satisfied, the selection unit 43 excludes, from metric calculation targets, the combination of terminals serving as a determination target. In addition to this, in the case where the second condition is satisfied, the selection unit 43 determines whether or not the above-mentioned first condition is satisfied.

According to this configuration of the base station 10, it is possible to reduce a metric calculation processing amount.

Third Embodiment

A third embodiment is related to variations of a calculation method for a PF metric of a combination of terminals serving as a metric calculation target. Note that a basic configuration of a base station of the third embodiment is similar to that of the base station 10 of the first embodiment or the second embodiment.

Figure 15:
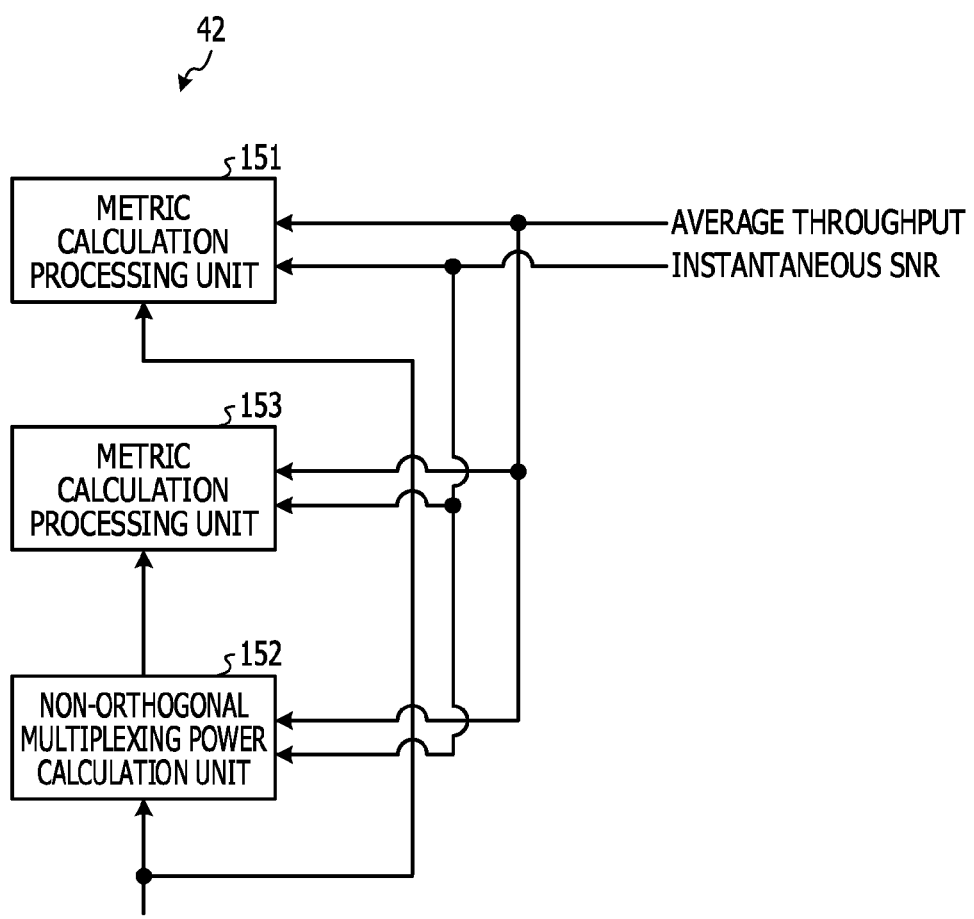
FIG. 15 is a block diagram illustrating an example of a metric calculation unit that calculates a PF metric of a combination of terminals in a base station of a third embodiment.

As illustrated in FIG. 15, in the base station 10 of the third embodiment, the metric calculation processing unit 42 includes a metric calculation processing unit 151, a non-orthogonal multiplexing power calculation unit 152, and a metric calculation processing unit 153. FIG. 15 is a block diagram illustrating an example of a metric calculation unit that calculates a PF metric of a combination of terminals in the base station of the third embodiment.

Regarding each of combinations of terminals serving as a "metric calculation target" in user multiplexing whose rank is higher than or equal to the three-user multiplexing, the metric calculation processing unit 151 calculates a PF metric for each of candidates of power distribution and defines a PF metric whose value is a maximum among the calculated PF metrics, as the PF metric of each of combinations of terminals. In other words, regarding each of combinations of terminals serving as a "metric calculation target" in user multiplexing whose rank is higher than or equal to the three-user multiplexing, the metric calculation processing unit 151 performs processing similar to that of the metric calculation processing unit 42 of the first embodiment. In other words, for example, an "iterative water-filling algorithm" of the related art is used.

Regarding each of combinations of terminals serving as a "metric calculation target" in the two-user multiplexing, using a first derivative of a calculation function of the PF metric, the non-orthogonal multiplexing power calculation unit 152 calculates a power value of the first terminal 50, which locally maximizes the relevant calculation function. In addition, using a condition that the sum of the power value of the first terminal 50 and a power value of the second terminal 50 is fixed, the power value of the second terminal 50 is calculated. In other words, the non-orthogonal multiplexing power calculation unit 152 finds an analytical solution of power.

Using, for example, the following Expression (51), the non-orthogonal multiplexing power calculation unit 152 calculates the power value $p_1$ of the first terminal 50 and the power value $p_2$ of the second terminal 50. Expression (51) may be obtained by solving Expression (14) with respect to $p_1$ under the condition that the derivative illustrated in Expression (14) is "0".

$$p_1 = \frac{T_1\gamma_2 - T_2\gamma_1}{\gamma_1\gamma_2(T_2 - T_1)} \qquad (51)$$

$$p_2 = 1 - p_1$$

Using power values of terminals 50 of each of combinations of terminals, calculated in the non-orthogonal multiplexing power calculation unit 152, each of the combinations of terminals serving as a metric calculation target, and the above-mentioned Expression (12), the metric calculation processing unit 153 calculates the PF metric of each of the combinations of terminals.

As described above, according to the present embodiment, in the base station 10, regarding each of combinations of terminals serving as a "metric calculation target" in the two-user multiplexing, using a first derivative of a calculation function of the PF metric, the non-orthogonal multiplexing power calculation unit 152 calculates the power value of the first terminal 50, which locally maximizes the relevant calculation function. In addition, using the power value of the first terminal 50, calculated in the non-orthogonal multiplexing power calculation unit 152, the metric calculation processing unit 153 calculates a PF metric.

According to this configuration of the base station 10, it is possible to further reduce metric calculation.

Fourth Embodiment

A fourth embodiment is related to a selection method for a combination of terminals serving as a metric calculation target and variations of a calculation method for a PF metric of a combination of terminals serving as a metric calculation target. Note that a basic configuration of a base station of the fourth embodiment is similar to that of the base station 10 of the first embodiment or the second embodiment.

Figure 16:
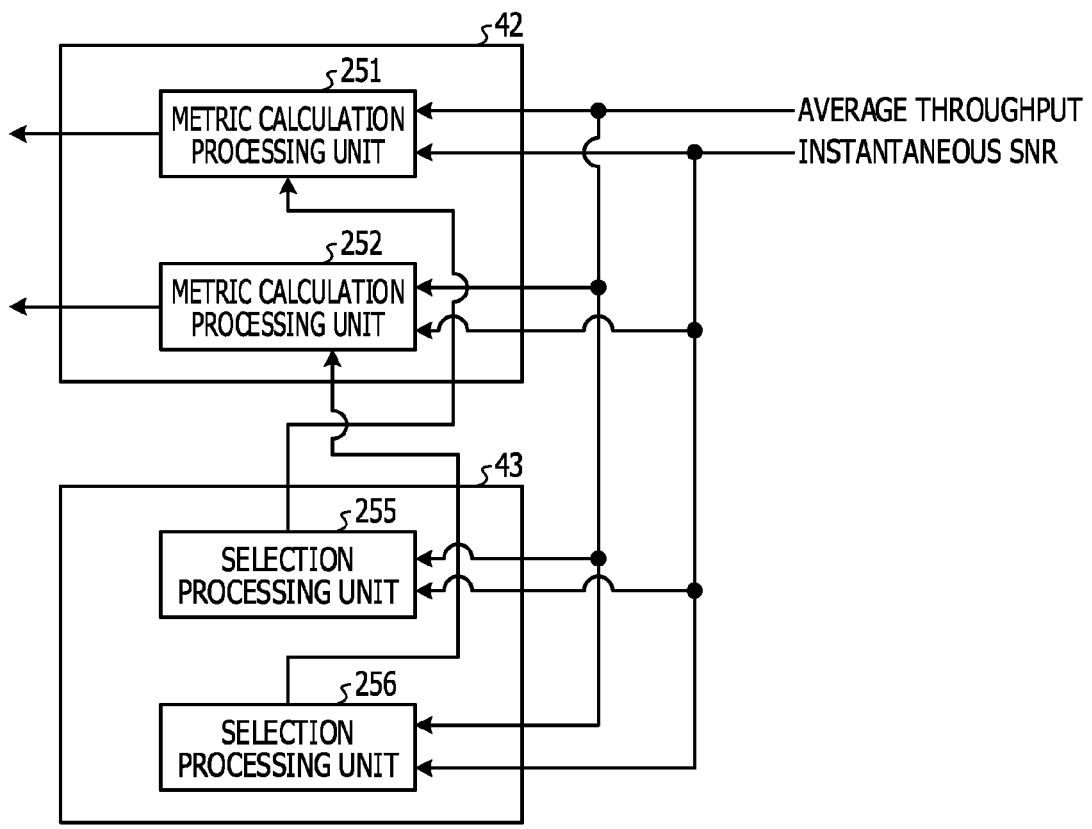
FIG. 16 is a block diagram illustrating examples of a metric calculation processing unit and a selection unit in a base station of a fourth embodiment.

As illustrated in FIG. 16, in the base station 10 of the fourth embodiment, the metric calculation processing unit 42 includes metric calculation processing units 251 and 252. In addition, the selection unit 43 includes selection processing units 255 and 256. FIG. 16 is a block diagram illustrating examples of a metric calculation processing unit and a selection unit in the base station of the fourth embodiment.

Using a method similar to that of the selection unit 43 in the first embodiment or the second embodiment, the selection processing unit 255 selects combinations of terminals serving as "metric calculation targets" in user multiplexing whose rank is higher than or equal to the three-user multiplexing.

Regarding each of combinations of terminals that serves as a "metric calculation target" and that is selected in the selection processing unit 255, the metric calculation processing unit 251 performs processing similar to that of the metric calculation processing unit 42 of the first embodiment. In other words, for example, an "iterative water-filling algorithm" of the related art is used.

Regarding each of combinations of terminals of the two-user multiplexing in the terminals 50-1 to 50-$N_S$ serving as the "scheduling processing targets", using a first derivative of a calculation function of the PF metric, the selection processing unit 256 calculates a power value of the first terminal 50, which locally maximizes the relevant calculation function. In other words, in accordance with the following Expression (52), the selection processing unit 256 calculates a power value $p_{1,tmp}$ of the first terminal 50, which locally maximizes the calculation function.

$$p_{1,tmp} = \frac{T_1\gamma_2 - T_2\gamma_1}{\gamma_1\gamma_2(T_2 - T_1)} \quad (52)$$

In addition, from among the combinations of terminals of the two-user multiplexing in the terminals 50-1 to 50-$N_S$ serving as the "scheduling processing targets", the selection processing unit 256 selects, as a "metric calculation target", a combination of terminals that satisfies a "first condition" and excludes, from "metric calculation targets", a combination of terminals that does not satisfy the "first condition".

This "first condition" is that the following Expression (53) is satisfied.

$$0 < p_{1,tmp} < 1 \quad (53)$$

In addition, using the following Expression (54), the selection processing unit 256 calculates power values of component terminals 50 of a combination of terminals satisfying Expression (53). The calculated power values of the component terminals 50 are output to the metric calculation processing unit 252.

$$p_1 = p_{1,tmp}$$

$$p_2 = 1 - p_1 \quad (54)$$

Using power values of terminals 50 of each of combinations of terminals, the combinations of terminals being selected in the selection processing unit 256 and serving as metric calculation targets, and the above-mentioned Expression (12), the metric calculation processing unit 252 calculates the PF metric of each of the combinations of terminals.

As described above, according to the present embodiment, in the base station 10, regarding the combination of terminals including two terminals of the first terminal 50 and the second terminal 50, using the first derivative of the calculation function of the PF metric, the selection processing unit 256 calculates a power value of the first terminal 50, which locally maximizes the relevant calculation function. In addition, while that the calculated power value of the first terminal 50 is larger than "0" and is smaller than "1" is defined as the "first condition", the selection processing unit 256 selects a metric calculation target.

According to this configuration of the base station 10, it is possible to further reduce a metric calculation processing amount.

Fifth Embodiment

In a fifth embodiment, by modifying the "first condition" described in the first embodiment, "metric calculation targets" are further reduced. Note that since a basic configuration of a base station of the fifth embodiment is similar to that of the base station 10 of the first embodiment, explanation will be performed with reference to FIGS. 5 to 7.

In the base station 10 of the fifth embodiment, from among all the combinations of terminals, in each of which the number of component terminals is up to $N_{max}$ within the terminals 50-1 to 50-$N_S$ serving as the scheduling processing targets, the selection unit 43 selects, as the "metric calculation targets", combinations of terminals, which satisfy the "first condition", and excludes combinations of terminals, which do not satisfy the "first condition", from the "metric calculation targets".

This "first condition" is illustrated as follows.

In other words, in the case of the two-user multiplexing, the "first condition" includes a condition that the following Expression (55) is satisfied.

$$\frac{\gamma_1(1 + \alpha_{max}\gamma_2)}{\gamma_2(1 + \alpha_{max}\gamma_1)} < \frac{T_1}{T_2} < \frac{\gamma_1(1 + \alpha_{min}\gamma_2)}{\gamma_2(1 + \alpha_{min}\gamma_1)} \quad (55)$$

Here, $\alpha_{max}$ and $\alpha_{min}$ are preliminarily decided setting values. In such a manner as, for example, $\alpha_{max}=0.99$ and $\alpha_{min}=0.01$, the $\alpha_{max}$ is set to a value smaller than "1" and close to "1" and the $\alpha_{min}$ is set to a value larger than "0" and close to "0". In other words, in the case where, for example, $p_1=0.01$ or $p_1=0.99$ is an optimal, the PF metric is not expected to increase. Therefore, in the case where power is very unevenly distributed to component terminals 50 of a combination of terminals, the relevant combination of terminals is excluded from metric calculation targets.

In addition, in the case of the three-user multiplexing, the "first condition" includes a condition that both the above-mentioned Expression (55) and the following Expression (56) are satisfied.

$$\frac{\gamma_2(1+\alpha_{max}\gamma_3)}{\gamma_3(1+\alpha_{max}\gamma_2)} < \frac{T_2}{T_3} < \frac{\gamma_2(1+\alpha_{min}\gamma_3)}{\gamma_3(1+\alpha_{min}\gamma_2)} \quad (56)$$

In addition, in the case of the m-user multiplexing whose rank is higher than or equal to the four-user multiplexing, the "first condition" includes a condition that the following Expression (57) is satisfied.

$$\frac{\gamma_{m-1}(1+\alpha_{max}\gamma_m)}{\gamma_m(1+\alpha_{max}\gamma_{m-1})} < \frac{T_{m-1}}{T_m} < \frac{\gamma_{m-1}(1+\alpha_{min}\gamma_m)}{\gamma_m(1+\alpha_{min}\gamma_{m-1})} \quad (57)$$

Note that if it is assumed that, in the above-mentioned Expression (55) to Expression (57), $\alpha_{max}=1$ and $\alpha_{min}=0$ are satisfied, the "first condition" illustrated in the first embodiment is obtained.

As described above, according to the present embodiment, the "first threshold value" is based on the second ratio of the first instantaneous SNR of the first terminal 50 to the second instantaneous SNR of the second terminal 50 and a predetermined first power value (in other words, $\alpha_{max}$), the "second threshold value" is based on the second ratio and a predetermined second power value (in other words, $\alpha_{min}$), and the predetermined first power value ($\alpha_{max}$) is larger than the predetermined second power value ($\alpha_{min}$). In addition, the predetermined first power value ($\alpha_{max}$) is a value smaller than "1" and the predetermined second power value ($\alpha_{min}$) is a value larger than "0".

According to this configuration of the base station 10, it is possible to further narrow down combinations of terminals serving as metric calculation targets. Therefore, it is possible to further reduce a metric calculation processing amount.

Sixth Embodiment

A sixth embodiment is related to an example in which the scheduling method described in one of the first embodiment to the fifth embodiment is applied to a combination of "beam forming" and NOMA. In other words, non-orthogonal multiplexing of users is performed in each beam. Note that here a case in which the scheduling method described in, for example, the first embodiment is applied to the combination of "beam forming" and NOMA will be described.

Example of Configuration of Base Station

Figure 17:
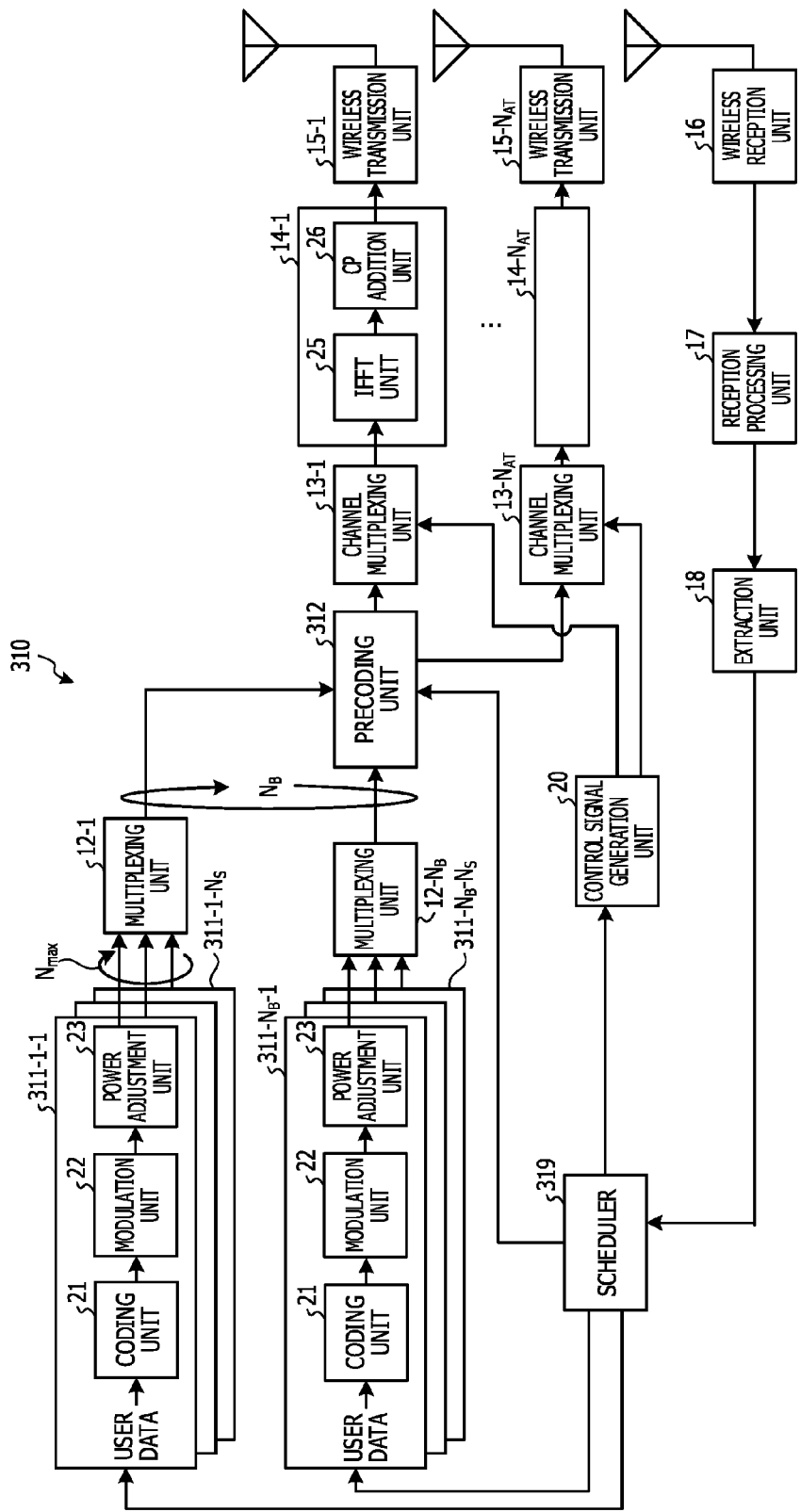
FIG. 17 is a block diagram illustrating an example of a base station of a sixth embodiment.

FIG. 17 is a block diagram illustrating an example of a base station of the sixth embodiment.

In FIG. 17, user data signal generation units 311-1 to 311-$N_B$ correspond to respective "beams" different from one another. In other words, the user data signal generation units 311-1-1 to 311-1-$N_{max}$ correspond to respective terminals 450 serving as scheduling targets within one beam.

Upon receiving "scheduling information" from a scheduler 319, each of the user data signal generation units 311 generates a user data signal, based on the scheduling information. The "scheduling information" includes the number of modulation levels, a coding rate, and a power value.

Multiplexing units 12-1 to 12-$N_B$ correspond to respective "beams" different from one another. For example, the multiplexing unit 12-1 receives, in the same time period, user data signals from the up to $N_{max}$ user data signal generation units 11, which correspond to a beam 1, and multiplexes the received data signals.

A precoding unit 312 multiplies multiplexed signals, received from the respective multiplexing units 12-1 to 12-$N_B$, by a precoding matrix determined in the scheduler 319 and outputs the obtained multiplexed signals subjected to precoding to channel multiplexing units 13-1 to 13-$N_{AT}$.

The channel multiplexing units 13-1 to 13-$N_{AT}$ correspond to respective antennas different from one another. In addition, OFDM transmission processing units 14-1 to 14-$N_{AT}$ correspond to the respective antennas different from one another. In addition, wireless transmission units 15-1 to 15-$N_{AT}$ correspond to the respective antennas different from one another.

Figure 18:
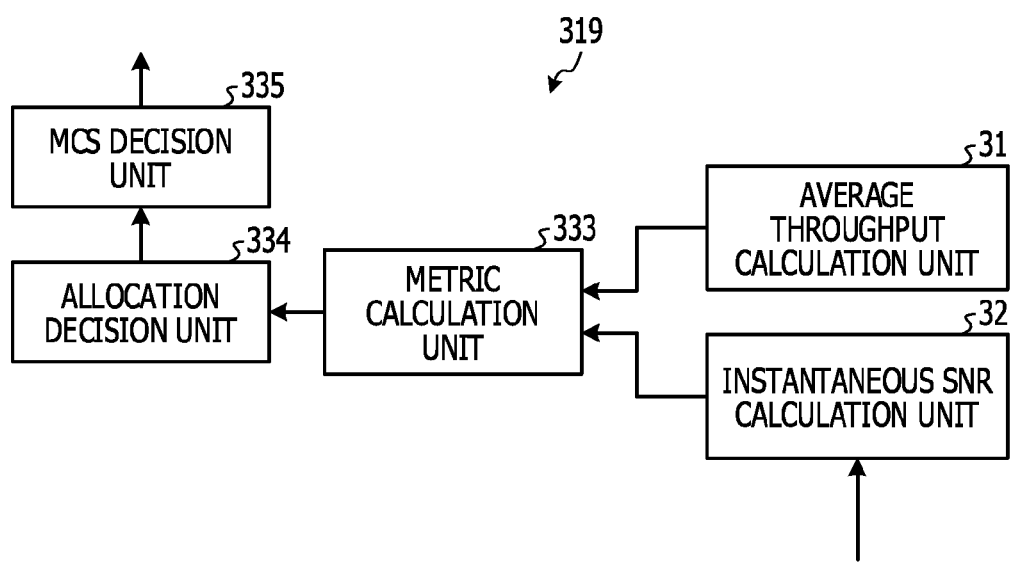
FIG. 18 is a block diagram illustrating an example of a scheduler of the sixth embodiment.
Figure 19:
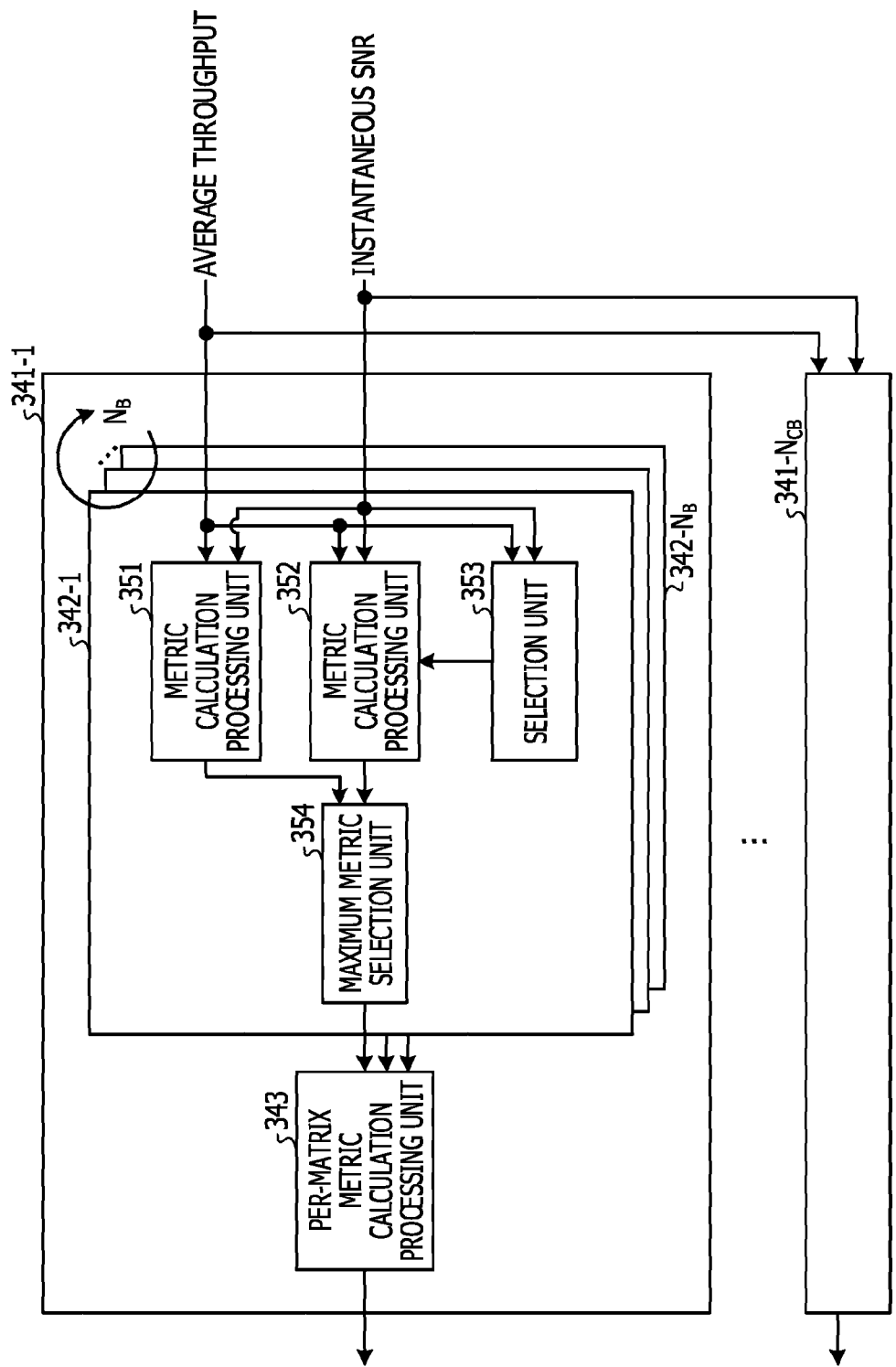
FIG. 19 is a block diagram illustrating an example of a metric calculation unit of the sixth embodiment.

As illustrated in FIG. 18, the scheduler 319 includes a metric calculation unit 333, an allocation decision unit 334, and an MCS decision unit 335. As illustrated in FIG. 19, the metric calculation unit 333 includes per-matrix metric calculation units 341-1 to 341-$N_{CB}$. FIG. 18 is a block diagram illustrating an example of a scheduler of the sixth embodiment. FIG. 19 is a block diagram illustrating an example of a metric calculation unit of the sixth embodiment.

The per-matrix metric calculation units 341-1 to 341-$N_{CB}$ correspond to respective precoding matrices different from one another. In other words, in the base station 310, $N_{CB}$ precoding matrices are prepared in advance. Each of the per-matrix metric calculation units 341 calculates a PF metric per precoding matrix. Here, the terminals 450 serving as "scheduling processing targets" of each of the per-matrix metric calculation units 341 are terminals 450 in which the precoding matrix corresponding to each of the per-matrix metric calculation units 341 is fed back as a "desired precoding matrix".

In addition, as illustrated in FIG. 19, each of the per-matrix metric calculation units 341 includes per-beam metric calculation units 342-1 to 342-$N_B$ and a per-matrix metric calculation processing unit 343.

The individual per-beam metric calculation units 342 calculate respective PF metrics for respective combinations of a precoding matrix and a beam, different from one another.

In addition, as illustrated in FIG. 19, each of the per-beam metric calculation units 342 includes metric calculation processing units 351 and 352, a selection unit 353, and a maximum metric selection unit 354.

Basically, the metric calculation processing units 351 and 352 and the selection unit 353 have the same functions as those of the metric calculation processing units 41 and 42 and the selection unit 43, respectively, of the first embodiment. In this regard, however, the terminals 450 serving as "scheduling processing targets" in the metric calculation processing units 351 and 352 and the selection unit 353 are terminals 450 in which the precoding matrix corresponding to each of the per-matrix metric calculation units 341 is fed back as a "desired precoding matrix".

Regarding one combination of a precoding matrix and a beam, the maximum metric selection unit 354 selects a maximum PF metric from among PF metrics calculated in the metric calculation processing units 351 and 352. In addition, the maximum metric selection unit 354 outputs the selected PF metric to the per-matrix metric calculation processing unit 343.

The per-matrix metric calculation processing unit 343 calculates the sum of PF metrics (in other words, PF metrics in units of beams) received from the corresponding per-beam metric calculation units 342-1 to 342-$N_B$ (in other words, a PF metric per matrix), and the per-matrix metric calculation processing unit 343 outputs the calculated sum to the allocation decision unit 334.

Returning to the description of FIG. 18, the allocation decision unit 334 decides, as "resource allocation targets", a precoding matrix and terminals 450 or a combination of terminals within a beam, which correspond to a PF metric whose value is a maximum among PF metrics received from the per-matrix metric calculation units 341-1 to 341-$N_{CB}$.

The MCS decision unit 335 decides a coding rate, the number of modulation levels, and an adjusted power to be applied to user data addressed to each of the terminals 450 serving as a resource allocation target decided in the allocation decision unit 334. In addition, the MCS decision unit 335 generates the above-mentioned scheduling information and control information and outputs the generated scheduling information and control information to a corresponding one of the user data signal generation units 311 and the control signal generation unit 20, respectively. In addition, the MCS decision unit 335 outputs, to the precoding unit 312, the precoding matrix serving as a resource allocation target decided in the allocation decision unit 334.

Example of Configuration of Terminal

Figure 20:
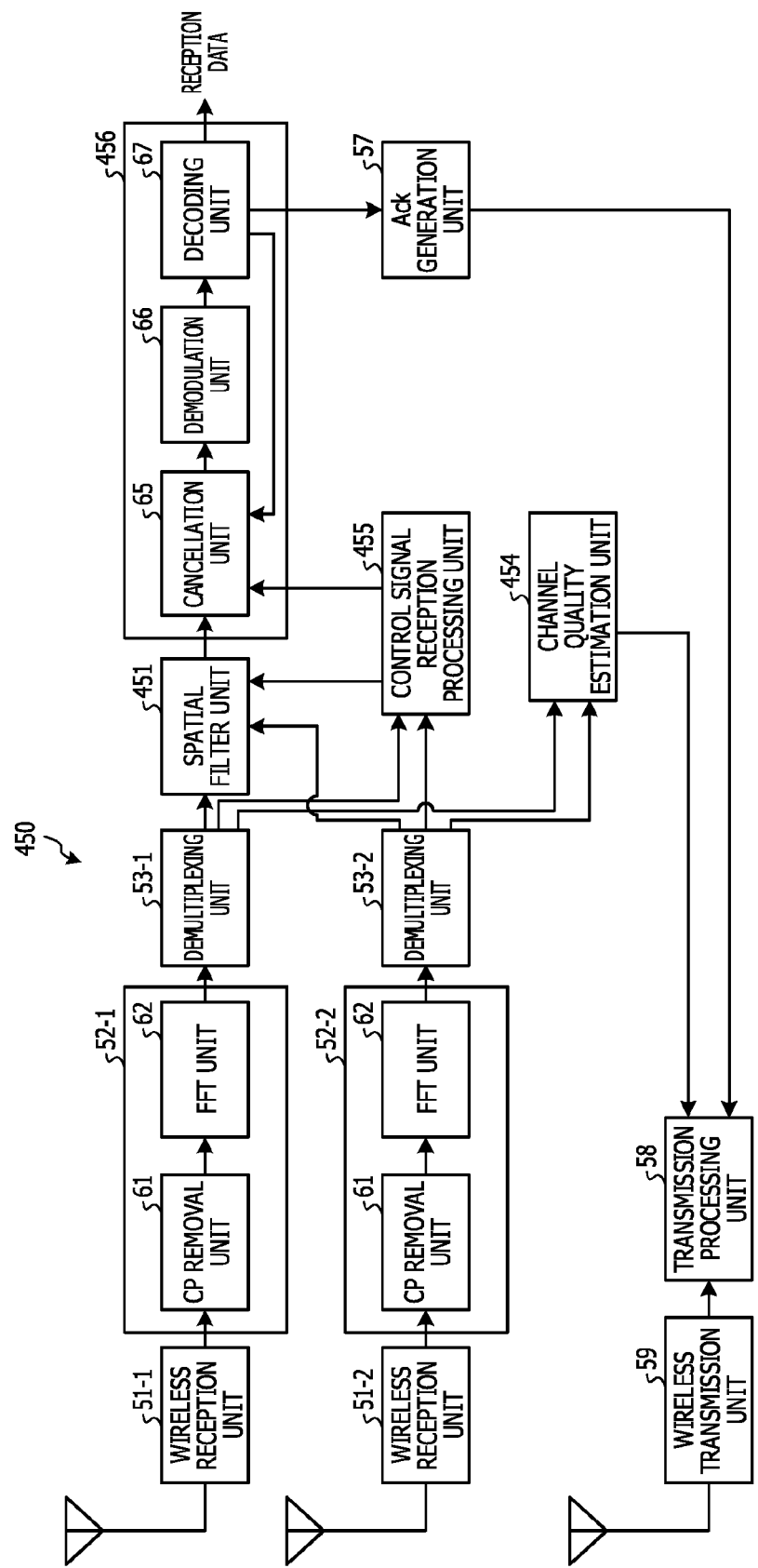
FIG. 20 is a block diagram illustrating an example of a terminal of the sixth embodiment.

FIG. 20 is a block diagram illustrating an example of a terminal of the sixth embodiment. In FIG. 20, each of the terminals 450 includes a spatial filter unit 451, a control signal reception processing unit 455, a channel quality estimation unit 454, and a reception processing unit 456. In FIG. 20, sets of the wireless reception units 51, the OFDM reception processing units 52, and the demultiplexing units 53 are provided so as to be equal to the number of antennas.

The channel quality estimation unit 454 calculates (estimates) a precoding matrix desired by the device itself and a channel quality estimation value of each of beams in the case where the relevant desired precoding matrix is applied. In addition, the channel quality estimation unit 454 outputs, to the transmission processing unit 58, the desired precoding matrix and the channel quality estimation value of each of beams.

The control signal reception processing unit 455 demodulates a control signal received from the demultiplexing unit 53 and outputs, to the reception processing unit 56, control information included in a demodulation result. The control information includes information indicating an actually applied precoding matrix, identification information of each of users serving as targets of the non-orthogonal multiplexing within each of beams, and a coding rate, the number of modulation levels, and an adjusted power value that are applied to a user data signal addressed to each of users. Note that in the case of using a specific pilot, the information indicating the precoding matrix does not have to be included in the control information.

Using, for example, a minimum mean square error (MMSE), the spatial filter unit 451 separates the beams.

In the reception processing unit 456, in a beam signal including a signal addressed to the device itself, the demodulation unit 66 and the decoding unit 67 perform demodulation processing and error correction decoding processing, respectively, on a signal addressed to another terminal 450 that is different from the device itself and that serves as a target of the non-orthogonal multiplexing and whose MCS is lower than the MCS of the device itself and is a minimum. In addition, in the case of successful error correction decoding, the decoding unit 67 feeds back, to the cancellation unit 65, obtained reception data addressed to the other terminal 450 different from the device itself. In addition, the cancellation unit 65 cancels the reception data received from the decoding unit 67 from the beam signal including the signal addressed to the device itself. The demodulation processing, the decoding processing, and the cancellation processing, described above, are performed on all terminals 450 that are different from the device itself and whose MCSs are lower than the MCS of the device itself. In addition, the demodulation unit 66 and the decoding unit 67 perform the demodulation processing and the error correction decoding processing, respectively, on a data signal addressed to the device itself.

By doing in such a manner as described above, even in the case where the "beam forming" and the non-orthogonal multiple access are combined, it is possible to reduce the number of metric calculation targets and as a result, it is possible to reduce a scheduling processing amount in the non-orthogonal multiple access.

Another Embodiment

Individual component elements in each of units illustrated in the embodiments do not have to be physically configured as illustrated in drawings. In other words, a specific example of the distribution or integration of the individual units is not limited to one of examples illustrated in drawings, and the individual units may be configured by functionally or physically integrating or distributing all or part of the individual units in arbitrary units according to various loads, various statuses of use, and so forth.

Furthermore, all or arbitrary part of various kinds of processing functions performed in each of devices may be performed on a central processing unit (CPU) (or a microcomputer such as a micro processing unit (MPU) or a micro controller unit (MCU)). In addition, all or arbitrary part of various kinds of processing functions may be performed on a program analyzed and performed on a CPU (or a microcomputer such as an MPU or a MCU) or may be performed on hardware based on hard-wired logic.

The base station and the terminals of one of the first embodiment to the sixth embodiment may be realized by, for example, the following hardware configuration.

Figure 21:
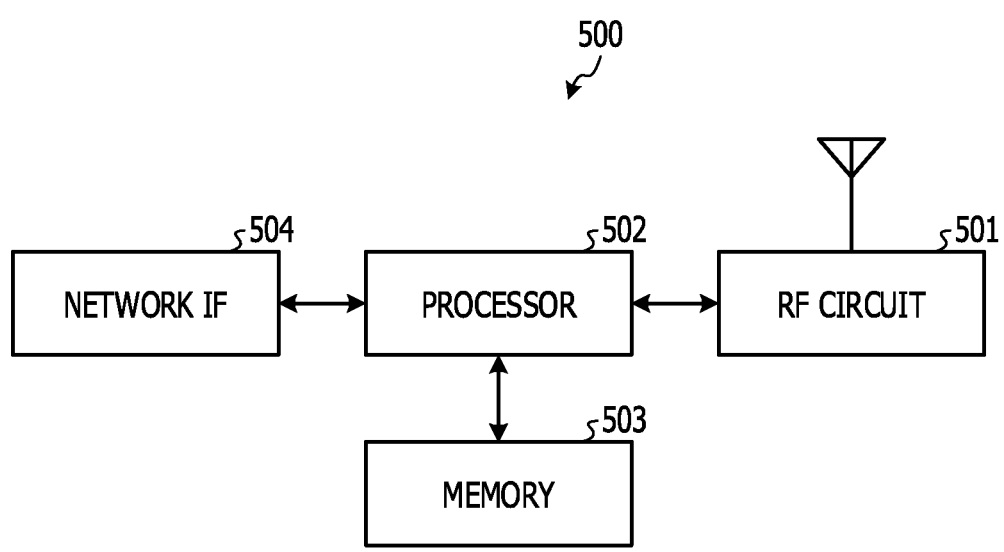
FIG. 21 is a diagram illustrating of an example of a hardware configuration of a base station.

FIG. 21 is a diagram illustrating of an example of a hardware configuration of a base station. As illustrated in FIG. 21, a base station 500 includes a radio frequency (RF) circuit 501, a processor 502, a memory 503, and a network interface (IF) 504. As an example of the processor 502, a central processing unit (CPU), a digital signal processor (DSP), a field programmable gate array (FPGA), or the like may be cited. In addition, as an example of the memory 503, a random access memory (RAM) such as a synchronous dynamic random access memory (SDRAM), a read only memory (ROM), a flash memory, or the like may be cited. Each of the base stations of the first embodiment to the sixth embodiment has a configuration illustrated in FIG. 21.

In addition, a processor included in an amplifying device may perform programs stored in various kinds of memories such as non-volatile storage media, thereby realizing various kinds of processing functions performed in the base station of one of the first embodiment to the sixth embodiment. In other words, programs corresponding to individual processing operations performed by the user data signal generation units 11 and 311, the multiplexing unit 12, the channel multiplexing unit 13, the OFDM transmission processing unit 14, the reception processing unit 17, the extraction unit 18, the schedulers 19 and 319, the control signal generation unit 20, and the precoding unit 312 may be recorded in the memory 503 and the individual programs may be executed by the processor 502. In addition, the wireless transmission unit 15 and the wireless reception unit 16 are realized by the RF circuit 501.

Note that while here explanation is performed under the assumption that the base station 500 is an integrated device, the base station 500 is not limited to this. For example, the base station 500 may be configured by two separated devices of a wireless device and a control device. In this case, the RF circuit 501 is arranged in, for example, the wireless device, and the processor 502, the memory 503, and the network IF 504 are arranged in, for example, the control device.

Figure 22:
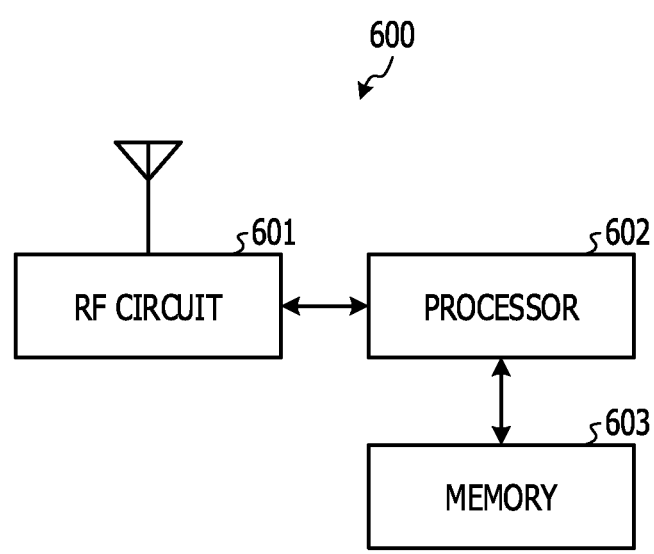
FIG. 22 is a diagram illustrating of an example of a hardware configuration of a terminal.

FIG. 22 is a diagram illustrating of an example of a hardware configuration of a terminal. As illustrated in FIG. 22, a terminal 600 includes an RF circuit 601, a processor 602, and a memory 603. Each of the terminals of the first embodiment to the sixth embodiment has the configuration illustrated in FIG. 22.

As an example of the processor 602, a CPU, a DSP, an FPGA, or the like may be cited. In addition, as an example of the memory 603, a RAM such as an SDRAM, a ROM, a flash memory, or the like may be cited.

In addition, a processor included in an amplifying device may perform programs stored in various kinds of memories such as non-volatile storage media, thereby realizing various kinds of processing functions performed in the terminals of the first embodiment to the sixth embodiment. In other words, programs corresponding to individual processing operations performed by the OFDM reception processing unit 52, the demultiplexing unit 53, the channel quality estimation units 54 and 454, the control signal reception processing units 55 and 455, the reception processing units 56 and 456, the Ack generation unit 57, the transmission processing unit 58, and the spatial filter unit 451 may be recorded in the memory 603 and the individual programs may be executed by the processor 602. In addition, the individual processing operations performed by the OFDM reception processing unit 52, the demultiplexing unit 53, the channel quality estimation units 54 and 454, the control signal reception processing units 55 and 455, the reception processing units 56 and 456, the Ack generation unit 57, the transmission processing unit 58, and the spatial filter unit 451 may be divided and performed by processors such as a baseband CPU and an application CPU. In addition, the wireless reception unit 51 and the wireless transmission unit 59 are realized by the RF circuit 601.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
    a memory; and
    a processor coupled to the memory and configured to:
        when scheduling a plurality of terminals based on non-orthogonal multiple access in which a same radio resource having a same time and a same frequency is allocable to two or more terminals of the plurality of terminals, calculate a metric for each of selected terminal combination and for each terminal of the plurality of terminals, the metric depending on power distribution to the selected terminal combination, the selected terminal combination being selected for candidates of the power distribution, each of the selected terminal combinations including two or more terminals selected from the plurality of terminals, and
        determine to allocate radio resources to each of the selected terminal combinations and each terminal of the plurality of terminals based on each metric,
    wherein
        the selected terminal combinations are obtained by selecting, from among all terminal combinations of the plurality of terminals, when each terminal combination satisfies a first condition, for a terminal combination including N terminals (N being a natural number more than 1), the first condition is that a throughput ratio of m−1th throughput to mth throughput is more than a first threshold value and less than a second threshold value for each m (2≤m≤N), the m−1th throughput being a throughput of m−1th terminal whose channel quality is m−1th highest in the N terminals, the mth throughput being a throughput of mth terminal whose channel quality is mth highest in the N terminals.

2. The base station according to claim 1, wherein each of the first threshold value and the second threshold value is obtained based on a channel quality ratio of m−1th channel quality of the m−1th terminal to mth channel quality of the mth terminal.

3. The base station according to claim 2, wherein
    the first threshold value is obtained further based on a first transmission power value, and
    the second threshold value is obtained further based on a second transmission power value that is less than the first transmission power value.

4. The base station according to claim 1, wherein
    for a terminal combination including N terminals (N being a natural number more than 1), the selected terminal combinations are obtained by selecting, from among all terminal combinations of the plurality of terminals, each terminal combination that satisfies a second condition and further satisfies the first condition, the second condition being that a throughput ratio of m−1th throughput to mth throughput is more than 1 for each m (2≤m≤N), the m−1th throughput being a throughput of m−1th terminal whose channel quality is m−1th highest in the N terminals, the mth throughput being a throughput mth terminal whose channel quality is mth highest in the N terminals.

5. The base station according to claim 1, wherein
    for a terminal combination including 2 terminals, the first condition is that a specified transmission power value is more than 0 and less than 1, the specified transmission power value being a transmission power value of a specified terminal of the 2 terminals, the specified transmission power value being obtained based on a local maximum of a function for calculating each metric.

6. The base station according to claim 1, wherein
    the selected terminal combinations are obtained by excluding, from among all terminal combinations of the plurality of terminals, each terminal combination that does not satisfy the first condition.

7. The base station according to claim 1, wherein each channel quality is a signal to noise ratio (SNR).

8. A resource allocation method comprising:
when scheduling a plurality of terminals based on non-orthogonal multiple access in which a same radio resource having a same time and a same frequency is allocable to two or more terminals of the plurality of terminals, calculating a metric for each selected terminal combination and each terminal of the plurality of terminals, the metric depending on power distribution to the selected terminal combination, the selected terminal combination being selected for candidates of the power distribution, each of the selected terminal combinations including two or more terminals selected from of the plurality of terminals; and
determining to allocate radio resources to each of the selected terminal combinations and each terminal of the plurality of terminals based on each metric, wherein
the selected terminal combinations are obtained by selecting, from among all terminal combinations of the plurality of terminals, when each terminal combination satisfies a first condition, for a terminal combination including N terminals (N being a natural number more than 1), the first condition is that a throughput ratio of m−1th throughput to mth throughput is more than a first threshold value and less than a second threshold value for each m ($2 \leq m \leq N$), the m−1th throughput being a throughput of m−1th terminal whose channel quality is m−1th highest in the N terminals, the mth throughput being a throughput of mth terminal whose channel quality is mth highest in the N terminals.

\* \* \* \* \*